(12) United States Patent
Ingham et al.

(10) Patent No.: US 11,116,182 B2
(45) Date of Patent: Sep. 14, 2021

(54) SYSTEM FOR MONITORING PASTURE INTAKE

(71) Applicants: COMMONWEALTH SCIENTIFIC AND INDUSTRIAL RESEARCH ORGANISATION, Acton (AU); THE CROWN IN RIGHT OF THE STATE OF NEW SOUTH WALES ACTING THROUGH THE DEPARTMENT OF PRIMARY INDUSTRIES AS AN OFFICE OF THE DEPARTMENT OF INDUSTRY, Orange (AU)

(72) Inventors: Aaron Ingham, Acton (AU); Ashfaqur Rahman, Acton (AU); Daniel Smith, Acton (AU); Greg Bishop-Hurley, Acton (AU); Philip Valencia, Acton (AU)

(73) Assignees: Commonwealth Scientific and Industrial Research Organisation, Acton (AU); The Crown in Right of the State of New South Wales Acting through the Department of Primary Industries as an office of the Department of Industry, Orange (AU)

( * ) Notice: Subject to any disclaimer, the term of this patent is extended or adjusted under 35 U.S.C. 154(b) by 0 days.

(21) Appl. No.: 16/306,974

(22) PCT Filed: Jun. 8, 2017

(86) PCT No.: PCT/AU2017/050569
§ 371 (c)(1),
(2) Date: Dec. 4, 2018

(87) PCT Pub. No.: WO2017/210740
PCT Pub. Date: Dec. 14, 2017

(65) Prior Publication Data
US 2019/0141959 A1 May 16, 2019

(30) Foreign Application Priority Data

Jun. 8, 2016 (AU) ................................ 2016902238
Feb. 1, 2017 (AU) ................................ 2017900303

(51) Int. Cl.
*A01K 29/00* (2006.01)
*A01K 11/00* (2006.01)
(Continued)

(52) U.S. Cl.
CPC .......... *A01K 29/005* (2013.01); *A01K 11/004* (2013.01); *A01K 11/008* (2013.01); *A01K 27/006* (2013.01); *A01M 31/002* (2013.01)

(58) Field of Classification Search
CPC .. A01K 29/005; A01K 11/004; A01K 11/008; A01K 27/006; A01M 31/002
See application file for complete search history.

(56) References Cited

U.S. PATENT DOCUMENTS 6,115,679 A 9/2000 Rutter et al.
7,705,736 B1 4/2010 Kedziora
(Continued)

FOREIGN PATENT DOCUMENTS

CN 103828764 A 6/2014
WO WO2011/069512 A1 6/2011
(Continued)

OTHER PUBLICATIONS

International Search Report dated Aug. 28, 2017 in connection with International Patent Application No. PCT/AU2017/050569 filed Jun. 8, 2017.
(Continued)

*Primary Examiner* — Amine Benlagsir
(74) *Attorney, Agent, or Firm* — Cooper & Dunham LLP; Paul Teng

(57) ABSTRACT

This disclosure relates to a system for monitoring pasture intake by a grazing animal species. The system comprises a
(Continued)

sensor spatially associated with a body part of the animal to generate movement data indicative of movement of the body part of the animal associated with multiple points in time and a processing server. The processing server comprises a data interface to receive the movement data and a processor that is configured to evaluate the received movement data to determine for each of the multiple points in time an indication of a behaviour of the animal at that point in time. Based on the indication the processor determines a time value indicative of a time the behaviour was shown by the animal, and determines a pasture intake value based on the time value.

17 Claims, 15 Drawing Sheets

(51) Int. Cl.
*A01K 27/00* (2006.01)
*A01M 31/00* (2006.01)

(56) References Cited

U.S. PATENT DOCUMENTS

| | | | | |
|---|---|---|---|---|
| 2010/0222709 | A1* | 9/2010 | Lepine | A01K 29/00 600/595 |
| 2011/0174229 | A1 | 7/2011 | Kerley et al. | |
| 2012/0221250 | A1 | 8/2012 | Cottle | |
| 2014/0180130 | A1* | 6/2014 | Granz | A61B 5/4238 600/476 |
| 2015/0282457 | A1* | 10/2015 | Yarden | A61D 17/00 340/573.2 |
| 2016/0066546 | A1 | 3/2016 | Borchersen et al. | |
| 2017/0118961 | A1* | 5/2017 | Halachmi | A01K 11/004 |
| 2017/0303505 | A1* | 10/2017 | Karsijns | A01K 29/005 |

FOREIGN PATENT DOCUMENTS

| | | | | |
|---|---|---|---|---|
| WO | WO-2011069512 A1 * | 6/2011 | | A01K 11/008 |
| WO | WO2013/005038 A1 | 1/2013 | | |
| WO | WO2016/059626 A1 | 4/2016 | | |
| WO | WO-2016059626 A1 * | 4/2016 | | A61B 5/1123 |

OTHER PUBLICATIONS

Written Opinion dated Aug. 28, 2017 in connection with International Patent Application No. PCT/AU2017/050569 filed Jun. 8, 2017.

Torben Godsk et al., "High Classification Rates for Continuous Cow Activity Recognition Using Low-cost GPS Positioning Sensors and Standard Machine Learning Techniques", In: Perner P. (eds) Advances in Data Mining. Applications and Theoretical Aspects. ICDM 2011. Lecture Notes in Computer Science, vol. 6870. Springer, Berlin, Heidelberg.

Ritaban Dutta et al., "Cattle Behaviour Classification Using 3-axis Collar Sensor and Multi-Classifier Pattern Recognition", Nov. 2-5, 2014, Valencia Spain. Electronic ISBN: 978-1-4799-0162-3.

Dec. 21, 2020 Chinese official action (and machine translation thereof into English) in corresponding Chinese Patent Application No. 201780045626.6.

* cited by examiner

| Pasture intake treatment (pellets) | n | Plot size (ha) | Starting biomass (kg DM/ha) | Biomass disappearance (kg DM/ha/d) | Final biomass (kg DM/ha) | RSD (kg DM/ha) | $r^2$ | Estimated pasture DMI (kg/d) |
|---|---|---|---|---|---|---|---|---|
| Farmtracker: Pasture intake range 8.0 – 16.1 kg DM/d | | | | | | | | |
| Low (1.5%LW) | 3 | 0.117c | 1826 | -78.4 | 963 | 91.7 | 0.91 | 9.1 b |
| Medium (0.75%LW) | 4 | 0.152b | 1820 | -80.0 | 940 | 93.4 | 0.91 | 12.1 ab |
| High (1kg) | 3 | 0.202a | 1702 | -72.4 | 906 | 80.2 | 0.92 | 14.6 a |
| P-value | | 0.003 | 0.60 | 0.20 | 0.88 | 0.20 | 0.70 | 0.020 |
| C-Dax: Pasture intake range 7.0 – 14.3 kg DM/d | | | | | | | | |
| Low (1.5%LW) | 3 | 0.117c | 1797 | -75.9 | 1054 | 106.8 | 0.90 | 7.9 b |
| Medium (0.75%LW) | 4 | 0.152b | 1771 | -67.6 | 978 | 88.5 | 0.94 | 11.5 a |
| High (1kg) | 3 | 0.202a | 1565 | -67.1 | 827 | 83.5 | 0.93 | 13.5 a |
| P-value | | 0.003 | 0.39 | 0.05 | 0.38 | 0.62 | 0.41 | 0.006 |

Fig. 14

| Pasture intake treatment | ADF (% DM) | | Crude protein (% DM) | | Metabolisable energy (% DM) | | Dry matter digestibility (%) | |
|---|---|---|---|---|---|---|---|---|
| | d -3 | d 11 | d -3 | d 11 | d -3 | d 11 | d -3 | d 11 |
| Low | 25.0 | 33.0 | 11.5 | 10.3 | 12.3 | 10.2 | 81.0 | 69.0 |
| Medium | 23.8 | 33.3 | 12.3 | 10.2 | 12.5 | 10.4 | 82.3 | 69.5 |
| High | 24.3 | 31.7 | 10.6 | 9.1 | 12.2 | 10.7 | 80.0 | 71.7 |
| Av. SED | 1.16 | 1.66 | 1.88 | 1.24 | 0.12 | 0.43 | 0.64 | 2.47 |
| P-value | 0.57 | 0.62 | 0.66 | 0.60 | 0.08 | 0.59 | 0.025 | 0.57 |

Fig. 15a

| Pasture intake treatment | Green leaf (%) | | Green stem (%) | | Green (%) | | Dead (%) | |
|---|---|---|---|---|---|---|---|---|
| | d -3 | d 11 | d -3 | d 11 | d -3 | d 11 | d -3 | d 11 |
| Low | 29.4 | 13.0 | 62.3 | 54.9 | 91.7 | 68.0 | 8.3 | 32.0 |
| Medium | 27.0 | 14.9 | 68.0 | 51.5 | 95.0 | 66.4 | 5.0 | 33.7 |
| High | 19.9 | 9.8 | 72.1 | 56.7 | 92.0 | 66.6 | 8.0 | 33.4 |
| Av. SED | 4.69 | 3.02 | 4.88 | 5.50 | 2.37 | 7.36 | 2.37 | 7.36 |
| P-value | 0.20 | 0.29 | 0.23 | 0.62 | 0.33 | 0.97 | 0.33 | 0.97 |

Fig. 15b

SYSTEM FOR MONITORING PASTURE INTAKE

TECHNICAL FIELD

This disclosure relates to a system for monitoring pasture intake of animals.

BACKGROUND

It is difficult to reliably measure individual intake of pasture on any scale, which precludes direct estimates of efficiency of grazing livestock under varying environmental conditions, or better precision in livestock management, especially for the national breeding herds and flocks.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A sensor network for monitoring pasture intake comprises multiple sensors mounted on respective animals to send monitoring data associated with multiple points in time and a processing server. The processing server comprises a wireless network interface to receive the monitoring data and a processor configured to evaluate a trained machine learning model on the received monitoring data to determine an indication of whether an animal was grazing for each of the multiple points in time, based on the indication determine a time value indicative of a time spent grazing for each of the animals, and determine a pasture intake value based on the time value.

A system for monitoring pasture intake by a grazing animal species comprises:

a sensor spatially associated with a body part of the animal to generate movement data indicative of movement of the body part of the animal associated with multiple points in time;

a processing server comprising:

a data interface to receive the movement data, a processor configured to evaluate the received movement data to determine for each of the multiple points in time an indication of a behaviour of the animal at that point in time, based on the indication determine a time value indicative of a time the behaviour was shown by the animal, and determine a pasture intake value based on the time value.

The multiple sensors may comprise acceleration sensors.

The multiple sensors may be mounted by a collar on the neck of the animals or by a halter on the head of the animals or by an ear tag.

A method for monitoring pasture intake by a grazing animal species comprises:

evaluating received monitoring data associated with multiple points in time to determine for each of the multiple points in time an indication of a behaviour of the animal at that point in time;

based on the indication determining a time value indicative of a time the behaviour was shown by the animal; and determining a pasture intake value based on the time value.

To determine a behaviour may comprise to select a behaviour from multiple candidate behaviours.

The multiple candidate behaviours may comprise grazing, resting, ruminating, walking and other.

To determine a behaviour may comprise to determine a grazing behaviour.

Evaluating the received monitoring data may comprise applying a trained machine learning model to the monitoring data.

The trained machine learning model may be a linear regression model.

The trained machine learning model may be based on a slope of the linear regression model.

The method may further comprise training the machine learning model based on historical observations of the animal.

Determining the pasture intake value may comprise evaluating a linear function for the time value.

The method may further comprise generating an output on a user interface indicative of the pasture intake value.

Generating the output on the user interface comprises determining a characteristic of a grazing environment of the animal based on the pasture intake value and the output comprises an indication of the grazing environment.

The output may be indicative of one or more of paddock status, biomass availability and animal preferences.

The method may be used for selecting an individual or reproductive or regenerative material from the individual for use in breeding, artificial insemination, in vitro fertilization, embryo implantation, or transgenics.

A process for producing genetic gain in a population comprises performing the method and selecting an individual having a high estimated breeding value from a population.

The process may comprise obtaining reproductive or regenerative material from the selected individual.

Reproductive or regenerative material may be obtained by performing the above process.

A computer-readable medium comprises a database of data pertaining to the reproductive or regenerative material obtained by performing the above process.

A process for producing genetic gain in a population comprises:

(i) performing the above method to thereby estimate the breeding value of one or more individuals in a population based on the pasture intake value;

(ii) selecting an individual from (i) having a high estimated breeding value;

(iii) obtaining reproductive or regenerative material from the selected individual; and (iv) producing one or more individuals or one or more generations of individuals from the reproductive or regenerative material.

A non-human may be produced by performing the above process.

A process for producing genetic gain in a population of multiple animals comprises:

evaluating for each of the multiple animals received monitoring data associated with multiple points in time to determine for each of the multiple points in time an indication of a behaviour of at that point in time, for each of the multiple animals based on the indication determining a time value indicative of a time the behaviour was shown by that animal, and determining for each of the multiple animals a food intake value based on the time value; and selecting an individual from the multiple animals having a high estimated breeding value based on the food intake value from a population.

The breeding value may be based on a productivity in relation to food intake.

Optional features described of any aspect of method, computer readable medium or computer system, where appropriate, similarly apply to the other aspects also described here.

BRIEF DESCRIPTION OF DRAWINGS

An example will now be described with reference to:

FIG. 14 illustrates example outputs of the disclosed method.

FIGS. 15a and 15b illustrate example data for pasture quality and quantity, respectively.

DESCRIPTION OF EMBODIMENTS

Figure 1:
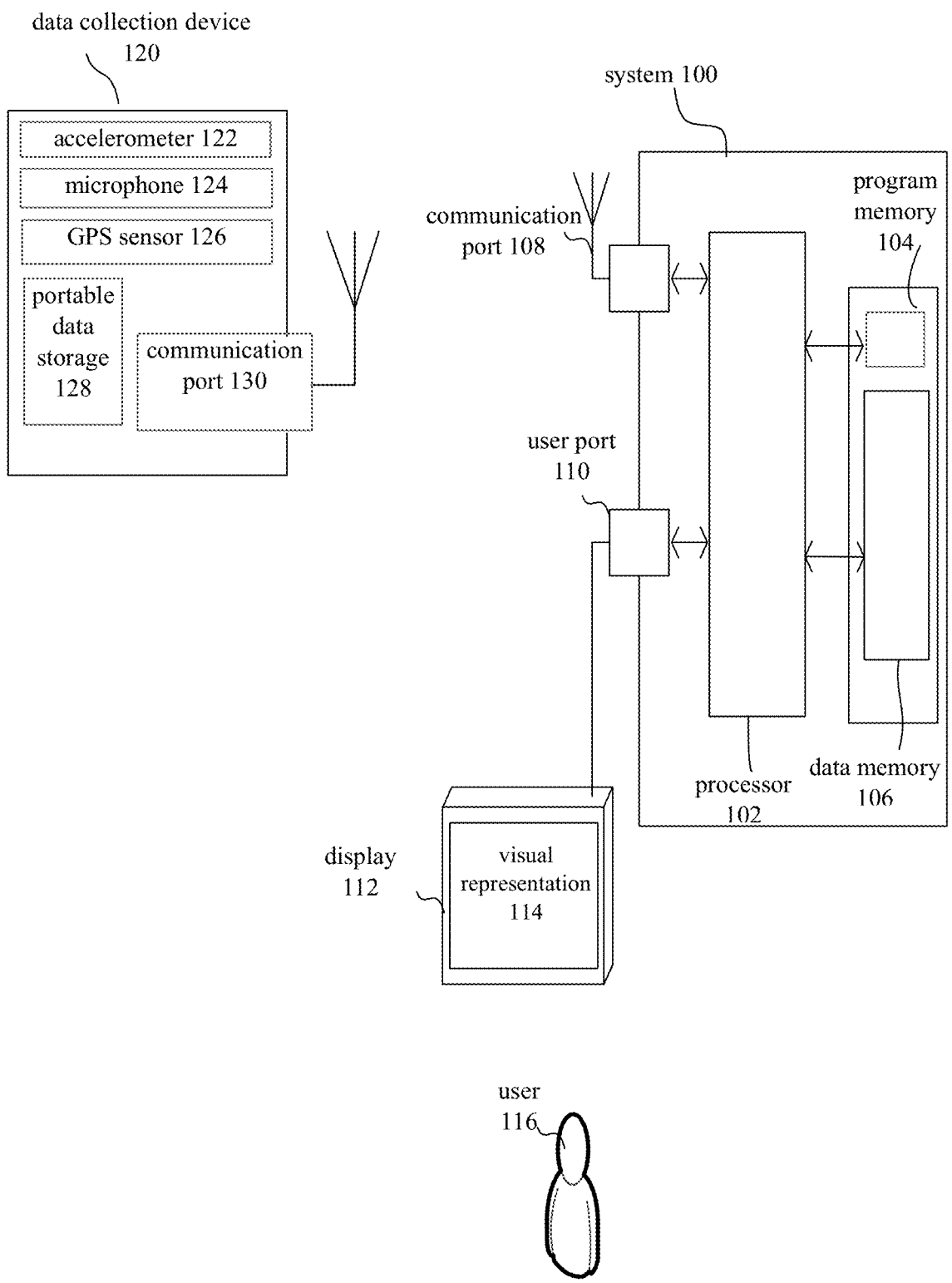
FIG. 1 illustrates a sensor network for monitoring pasture intake.

Measuring pasture intake is important because pasture intake can be an indicator for the quality of the grazing environment as well as an indicator of breeding value. In particular, a declining pasture intake across multiple animals in the same paddock may indicate insufficient biomass availability or available biomass that does not correspond to the animals' preferences. Further, pasture intake can be considered a cost which allows the calculation of an efficiency measure, such as weight over pasture intake, calves over pasture intake or calf weight over pasture intake, or milk or milk component yield over pasture intake. Animals with higher efficiency measure can be selected for breeding to increase the efficiency of the population.

This disclosure provides systems and methods for monitoring and measuring pasture intake which are more accurate and less complex than existing methods. This allows these systems and methods to be deployed at scale to each animal and improve the overall operation of the farming business. It also allows to quantify intake while animals are exhibiting natural grazing behaviour and feeding preferences in the normal production environment as compared to isolated animals in enclosures that have limited food choices.

While some examples herein relate to pasture intake and grazing of ruminants and other grazing animal species, it is to be understood that some proposed solutions are equally applicable to general feed intake, such as at feed lots. In particular, applying the proposed solutions to feed lots would reduce the significant investments into scales and RFID systems.

Examples for animals that can be monitored using the proposed methods and systems are ruminants including cattle, sheep, goats and horses and other non-ruminant grazing animal species including pigs.

This disclosure provides a reliable estimate of intake by individual ruminants to improve productivity & efficiency. Intake is the primary input variable to determine productivity and efficiency, plus a sensitive response variable(s) for environmental changes.

Improved genetic merit incl. genomics

Greater precision in livestock management

Optimisation of pasture management systems

Input data for prediction & simulation models

The output can provide answers to the following questions: Is the efficiency of feed utilisation of two classes of animals e.g. growing vs breeding and/or types of environment e.g. feedlot vs pasture, influenced by the same sets of genes? and relevant to the same industrial pathways?

Pasture intake may be based on one or more of the following chemical markers: Chromic oxide, Alkanes and use of Controlled release devices. Pasture intake may be based on one or more of the following biomass disappearance methods:

Quadrats (calibration)

Capacitance probes

Electronic plate meters

C-DAX pasture height meter

Greenseeker, crop circle (vegetation indices including NDVI)

Exclusion cages (regrowth, effects of atmospheric and soil moisture)

Other new technologies (eg LIDAR)

Figure 2A:
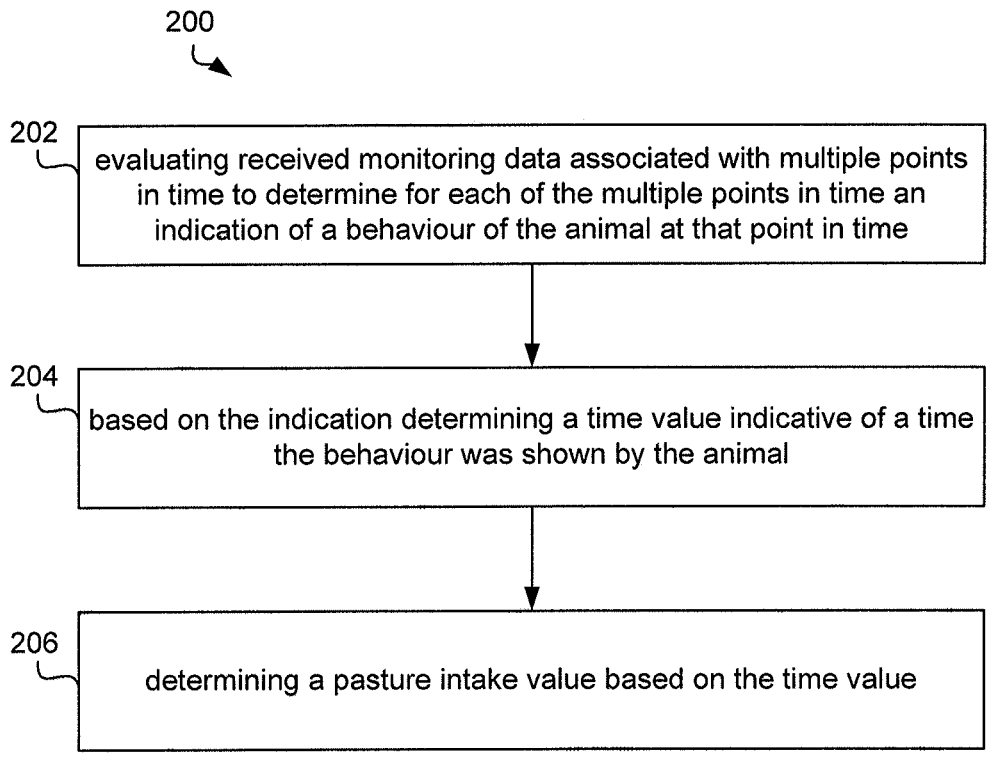
FIG. 2a illustrates a method as performed by processor for monitoring pasture intake.

FIG. 1 illustrates a computer system 100 for monitoring pasture intake. The computer system 100 comprises a processor 102 connected to a program memory 104, a data memory 106, a communication port 108 and a user port 110. The program memory 104 is a non-transitory computer readable medium, such as a hard drive, a solid state disk or CD-ROM. Software, that is, an executable program stored on program memory 104 causes the processor 102 to perform the method in FIG. 2. The term "determining a pasture intake" refers to calculating a value that is indicative of the pasture intake. This also applies to related terms.

Processor 102 receives via communication port 108 monitoring data from data collection device 120 that is spatially associated with a body part of an animal, such as the head or a leg. For example, data collection device 120 may be a collar mounted to the neck or other parts of the animal such that the data collection device 120 moves when the head (or leg) of the animal moves. Data collection device 120 comprises multiple sensors, such as 3D accelerometer 122, microphone 124 and GPS sensor 126. In other examples, data collection device 120 comprises one or more of 3-axis inertial (movement) sensors
Pressure (height sensing)
Audio (biting, chewing)
Temperature and humidity
Spatial localization
4-channel light sensor
Solar panel with battery storage
Digital radio (including communication port 130) for real-time reporting
High-rate data logged to portable data storage device (e.g., micro-SD) 128

The data from some or all of the sensors from data collection device 120 is referred to as monitoring data. The processor 102 may then store the monitoring data on data store 106, such as on RAM or a processor register. Processor 102 may also send the determined pasture intake via communication port to a server, such as farm management server.

The processor 102 may receive data, such as the monitoring data, from data memory 106 as well as from the communications port 108 and the user port 110, which is connected to a display 112 that shows a visual representation 114 of the plot to a user 116. In one example, the processor 102 receives monitoring data from data collection device 120 via communications port 108, such as by using a Wi-Fi network according to IEEE 802.11. The Wi-Fi network may be a decentralised ad-hoc or multi-hop sensor network, such that no dedicated management infrastructure, such as a router, is required or a centralised network with a router or access point managing the network. In other examples, processor 102 receives the monitoring data from a portable data storage (such as an SD card) 128 that is manually transferred from the data collection device 120 to the computer system 100. The processor 102 may also be part of the monitoring device.

In one example, the processor 102 receives and processes the monitoring data in real time. This means that the processor 102 determines the pasture intake every time monitoring data is received from the data collection device and completes this calculation before the data collection device sends the next monitoring data update.

Although communications port 108 and user port 110 are shown as distinct entities, it is to be understood that any kind of data port may be used to receive data, such as a network connection, a memory interface, a pin of the chip package of processor 102, or logical ports, such as IP sockets or parameters of functions stored on program memory 104 and executed by processor 102. These parameters may be stored on data memory 106 and may be handled by-value or by-reference, that is, as a pointer, in the source code.

The processor 102 may receive data through all these interfaces, which includes memory access of volatile memory, such as cache or RAM, or non-volatile memory, such as an optical disk drive, hard disk drive, storage server or cloud storage. The computer system 100 may further be implemented within a cloud computing environment, such as a managed group of interconnected servers hosting a dynamic number of virtual machines.

It is to be understood that any receiving step may be preceded by the processor 102 determining or computing the data that is later received. For example, the processor 102 determines pasture intake and stores the pasture intake in data memory 106, such as RAM or a processor register. The processor 102 then requests the data from the data memory 106, such as by providing a read signal together with a memory address. The data memory 106 provides the data as a voltage signal on a physical bit line and the processor 102 receives the pasture intake via a memory interface.

It is to be understood that throughout this disclosure unless stated otherwise, nodes, edges, graphs, solutions, variables, farm parameters and the like refer to data structures, which are physically stored on data memory 106 or processed by processor 102. Further, for the sake of brevity when reference is made to particular variable names, such as "period of time" or "pasture intake" this is to be understood to refer to values of variables stored as physical data in computer system 100.

FIG. 2 illustrates a method 200 as performed by processor 102 for monitoring pasture intake. FIG. 2 is to be understood as a blueprint for the software program and may be implemented step-by-step, such that each step in FIG. 2 is represented by a function in a programming language, such as C++ or Java. The resulting source code is then compiled and stored as computer executable instructions on program memory 104.

It is noted that for most humans performing the method 200 manually, that is, without the help of a computer, would be practically impossible. Therefore, the use of a computer is part of the substance of the invention and allows performing the necessary calculations that would otherwise not be possible due to the large amount of data and the large number of calculations that are involved.

Processor 102 evaluates 202 the received monitoring data associated with multiple points in time to determine for each of the multiple points in time an indication of a behaviour of the animal at that point in time. Processor 102 may apply a trained machine learning model to the monitoring data as in more detail described below.

Figure 2B:
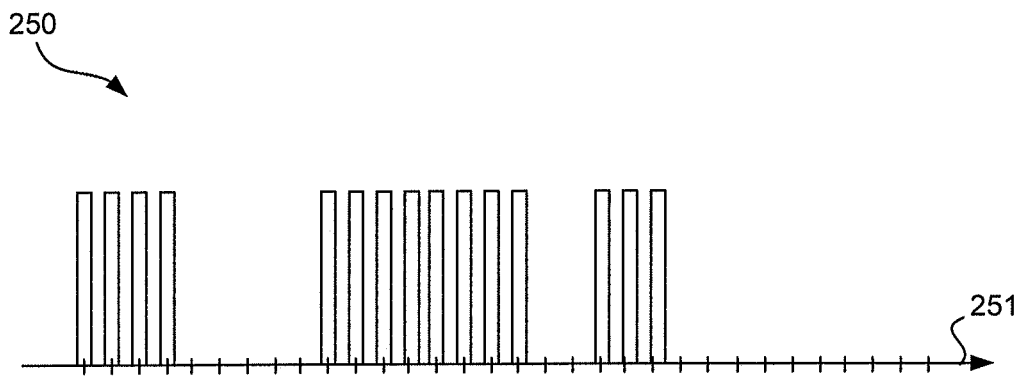
FIG. 2b illustrates a time line indicating feeding behaviour at points in time.

FIG. 2b illustrates an example timeline 200 showing the behaviour of the animal for multiple points in time. In this case only one behaviour is shown for simplicity. This behaviour may be a feeding behaviour, such as grazing or feeding in a feed lot, or other behaviours, such as resting, or rumination. In this example, processor 102 determines the behaviour periodically, such as every 10 s, as indicated by the ticks on time axis 251. For some features, such as frequency components, processor 102 may consider multiple sensor measurements during a time window, such as a time window of 10 s, for each point in time on time axis 251. The bars shown in FIG. 2b illustrate points in time where processor 102 determines a grazing behaviour.

Processor 102 then uses the indication of the behaviours as schematically shown FIG. 2*b* to determine a time value indicative of a time the behaviour was shown by the animal. In this case, processor 102 counts the number of time values where grazing was detected. In the example of FIG. 2*b*, there are 15 points in time where grazing behaviour was detected. As a result, the time value is 15 points or 150 s in case of 10 s sample intervals.

Processor 102 also determines a pasture intake value based on the time value. In one example, processor 102 multiplies the time value by a feeding rate, such as kg/h. To calibrate the feeding rate, the reduction of available biomass on the paddock can be measured frequently and correlated against the determined time spent grazing as described in further detail below.

Processor 102 may determine the behaviour in step 202 by using one or more of three machine learning models that are trained and then validated upon ground truth observations of behaviours:

Support Vector Machine (SVM) wth rbf kernel

Decision Tree (DT)

Linear Discriminant Analysis (LDA)

During the training of each classifier, feature selection may be used by processor 102. A 'greedy search' may be used to select the set of features to be used by each classifier. Processor 102 selects the features that provided the highest 'leave out animal(s)' cross-validation performance for the classifiers.

| Feature Group | Underlying Features |
|---|---|
| Statistical | 1. Mean |
| | 2. Standard Deviation |
| | 3. Skew |
| | 4. Kurtosis |
| | 5. Sum of Absolute Values |
| Spectral | 6. Spectral Centroid |
| | 7. Spectral Spread |
| | 8. Spectral Kurtosis |
| | 9. Spectral Flatness |
| | 10. Fundamental Frequency |
| Information Theory | 11. Entropy |
| | 12. AR coefficient |
| | 13. Spectral AR coefficient |
| | 14. Coding Efficiency |

In one example, processor 102 applies the following classification to generate pasture intake data against which the sensor algorithm that predicts intake is generated (i.e. training data):Low pasture intake: pellets at 1.5% LW—pasture intake ~1-1.5% LW or ~7.5 kg DM intake/d (n=3 steers)

Medium pasture intake: pellets at 0.75% LW—pasture intake ~1.75-2% LW or ~10 kg DM intake/d (n=4 steers)

High pasture intake: 1 kg pellets/d—pasture intake ~15 kg DM intake/d (n=3 steers)

In one example, the predictive capacity & error is: R2≤0.6; RSD≥1.65 kg DM/d (intake range 7.5-15 kg); Ryegrass monoculture, minimal variation.

There is provided an estimated intake of pasture using the disclosed pasture intake platform, sensor devices and behavioural classifiers with reasonable reliability. May be used to rank animals for genetic improvement.

The following sources of variations may be incorporated into the algorithm:

Pasture types & species

Pasture height & biomass availability

Pasture maturity, morphology & digestibility

Mixed swards

Sensors, sensor device location, target behaviours

Livestock characteristics

There is provided a method based on 3-axis accelerometer readings that can be used to determine the amount of pasture consumed by a free grazing ruminant.

The training steps are shown in chronological order but may be performed in a different order:

Variation in pasture intake is achieved by feeding variable amounts of supplement to animals.

Accelerometer data is collected from a device located in a collar mounted on the neck of an animal.

Time spent grazing is calculated from machine learning algorithms that incorporate 84 possible features that have been extracted from short time intervals of the accelerometer data.

Pasture dry matter intake (DMI, kg/d) is calculated from the equation=−4.128+2.325×hours spent grazing/d (P=0.010, $r^2$=0.534, s.e.=1.65 kg/d). Pasture DMI for each steer (one steer/≤0.22 ha ryegrass plot) was estimated from the slope (kg DM/d) of the regression of total pasture DM/plot on intake day over an 11 d period.

Pasture dry matter intake may also be inferred in a similar manner based on a relationship involving other classified behaviour, such as grazing, resting, ruminating or walking, alone or in combination.

One methodology for assessing pasture intake is based on complex chemical marker based approaches. This is time consuming, intrusive on animals and their normal behaviour, expensive and is difficult to perform at scale, thereby preventing widespread application.

The sensors may be mounted on a collar or other device fitted to the head or neck of the animal containing 3-axis accelerometer data from which enables grazing and other behaviours to be reliably classified, and determines the relationships between the time spent in different behaviours with intake of pasture measured in our Pasture Intake Platform.

Processor 102 infers (step 202) grazing ruminant behaviour from the 3-axis accelerometer data by applying a classification model based upon machine learning. The model is constructed (trained) from accelerometer data during periods where grazing and other behaviours of interest have been recorded for the animals by human observers (supervised training). The model is trained to maximise the discrimination between the behaviours of interest (include grazing). In other words, there are multiple candidate behaviours including grazing, and processor 103 selects one of the multiple candidate behaviours. Once the model is trained, the accelerometer data of any animal (in that species) can be applied to the model and its behaviour can be inferred. For example, processor 102 selects the behaviour with the highest score generated by the machine learning model. In particular, processor 102 applies the trained machine learning model to the monitoring data and calculates a score for each of the behaviours of grazing, resting, ruminating, walking and other. Processor 102 then selects the behaviour with the highest score for each point in time separately.

To train and also apply the model, 3 axis accelerometer data is partitioned into short time intervals. For each interval, a set of 84 features are extracted. These features represent the motion and positioning of the animal's head across the time interval. During training, a subset of features are selected to best discriminate between grazing and the other behaviours. These selected features are then used as the inputs to train the machine learning model and apply it afterwards.

In one example, the processing server 100 performs the training and stores the learned parameters of the machine learning method on data memory 106. Processing server 100 then also performs the evaluation of the received monitoring data. In other examples, the sensor 120 itself performs the training or evaluation or both and may transmit a binary grazing/not-grazing signal to processing server 100. In yet another example, the data collection device 120 determines and sends the time spent grazing or the pasture intake value to processing server 100.

Other sensors include Bioacoustics, SCR VocalTag, leg-mounted accelerometers http://www.icerobotics.com/) or nose band pressure sensors (IGER Bite meters and Rumi-Watch) that can classify behaviours that relate indirectly or directly to grazing.

Models may classify grazing time and estimate the bite rate within grazing periods using a di-axial or tri-axial accelerometer from a neck mounted collar. A mixed linear model using total estimated grazing time and total estimated bites as the response variables may be used to predict the feed intake over that period.

One example does not allow grazing time estimation to be generalised to cattle not included in the experiment. A grazing classifier may use high motion intensity in the forward direction (y axis of accelerometer) to classify an activity as grazing. An individual grazing threshold is set for each bovine animal by manually observing its y-axis accelerometer distribution of known grazing periods. Hence, grazing time estimation is difficult to be generalised to cattle (i) outside the study (ii) in the same study without the individual having its own ground truth grazing data. In contrast, other grazing classifiers proposed herein are not individualised and have a demonstrated ability to generalise its performance to "new" cattle that were not used in developing the classifier. This in turn means this approach to feed intake estimation approach has a wider scope of application than other approaches, which were implemented for a particular research study.

Furthermore, even under the conditions where the models were individualized, the classification accuracy of other methods may be relatively poor (classification accuracy<80%) in relation to our grazing performance.

The intake of individual dairy cows can be used as NE requirement for maintenance, milk production, weight gain and pregnancy. In other example, biomass availability can be measured daily to determine pasture disappearance by regression over the 11 d pasture intake period for each steer within its individual grazing plot using two pasture meters (mean r2≈0.90 for pasture intake estimates using each pasture meter) within the disclosed Pasture Intake Platform facility. It may be assumed the difference between requirement & NE intake in the barn was the NE intake of grass, whereas we "measured" intake of grass directly in the field plots.

The sensors can be used to determine pasture intake. This measurement can then be used to determine animal efficiency by comparing to live weight and growth of the animal, or kg of calf weaned, or yield of milk or milk components produced. This trait can be used in breeding programs to rank animals based on efficiency. The ranking may be provided by processor 102 in the form of a report, such as a printed or pdf document, with a list of animals that is ordered by efficiency. Processor 102 may also generate a user interface on screen 112 that shows the ranking. In another example, processor 102 generates an indication of the rank for each animal, such as "4/30" meaning this animal is the $4^{th}$ most efficient of a population of 30 or "13%" to express the rank as a percentage of equal or more efficient animals over the population. Processor 102 may store the rank indication associated with each animal and may generate an animal report including this rank. A breeder can then see the efficiency rank of the animal from the report and make a decision on whether to use this animal for breeding.

The output might also be used to optimise production, animal or pasture management, animal welfare, and animal health status. The current form of the disclosure is targeted at cattle (beef and dairy) but may also be applicable to pasture grazing animals worldwide.

Figure 3:
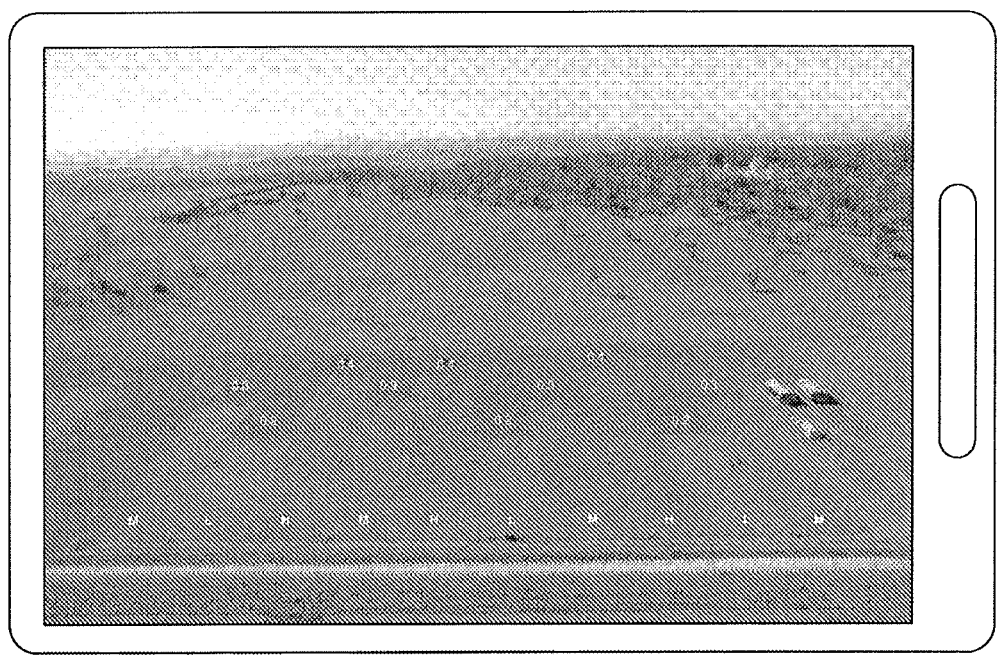
FIG. 3 illustrates a user interface comprising an image of a feeding plot with superimposed numbers representing individual plot and animal number within experiments that can be used to determine pasture intake.
Figure 4:
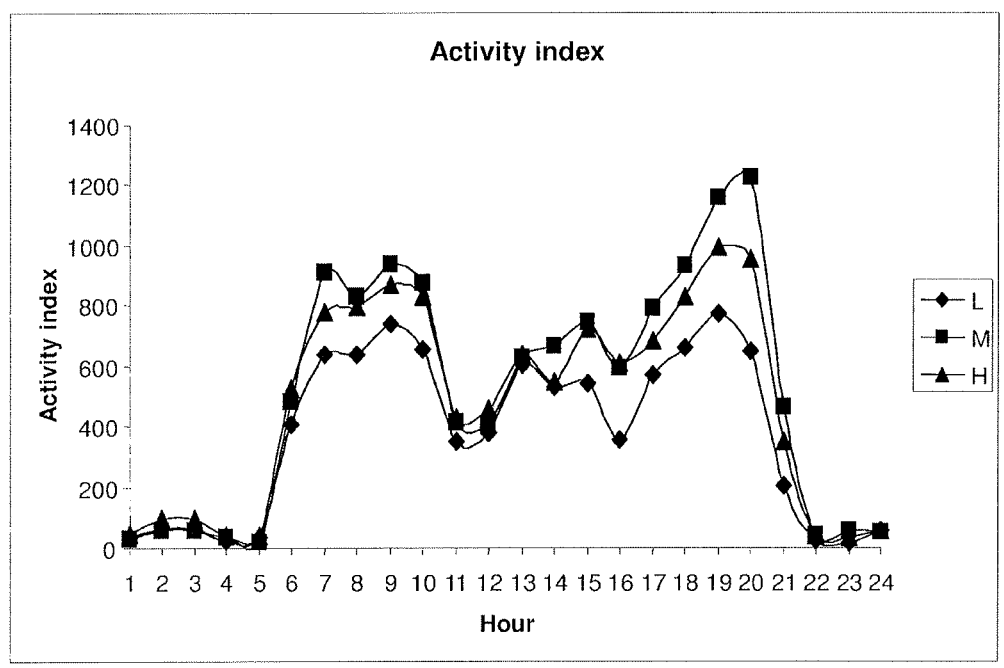
FIG. 4 illustrates an activity index based on the monitoring data.
Figure 5A:
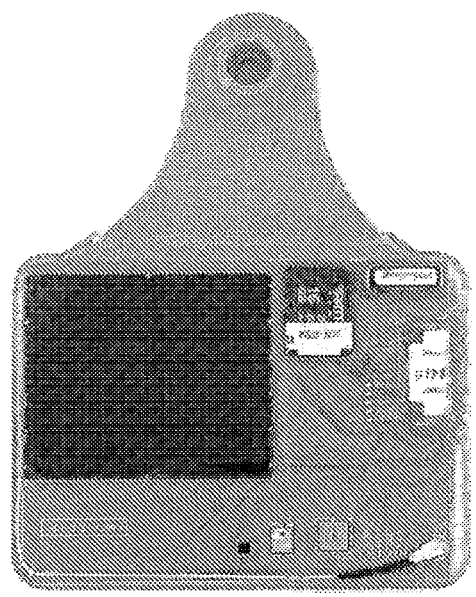
FIGS. 5a and 5b illustrate example designs of data collection device 120.
Figure 5B:
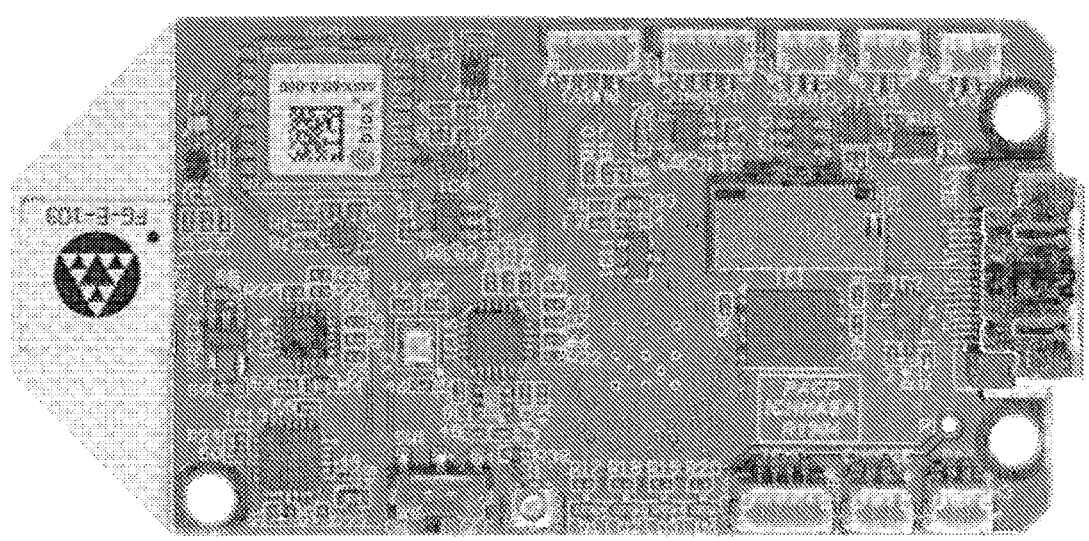
Figure 6A:
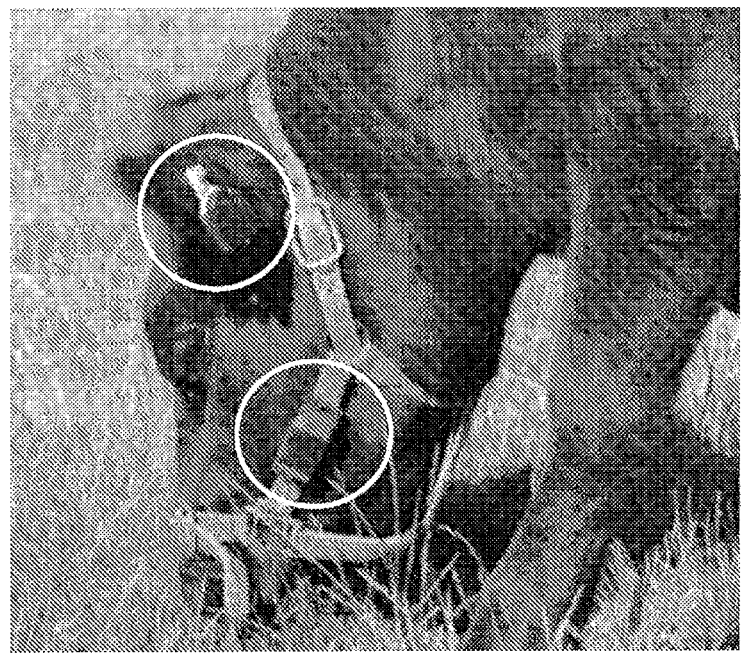
FIGS. 6a and 6b illustrates example mounting of the data collection device 120 on cattle.
Figure 6B:
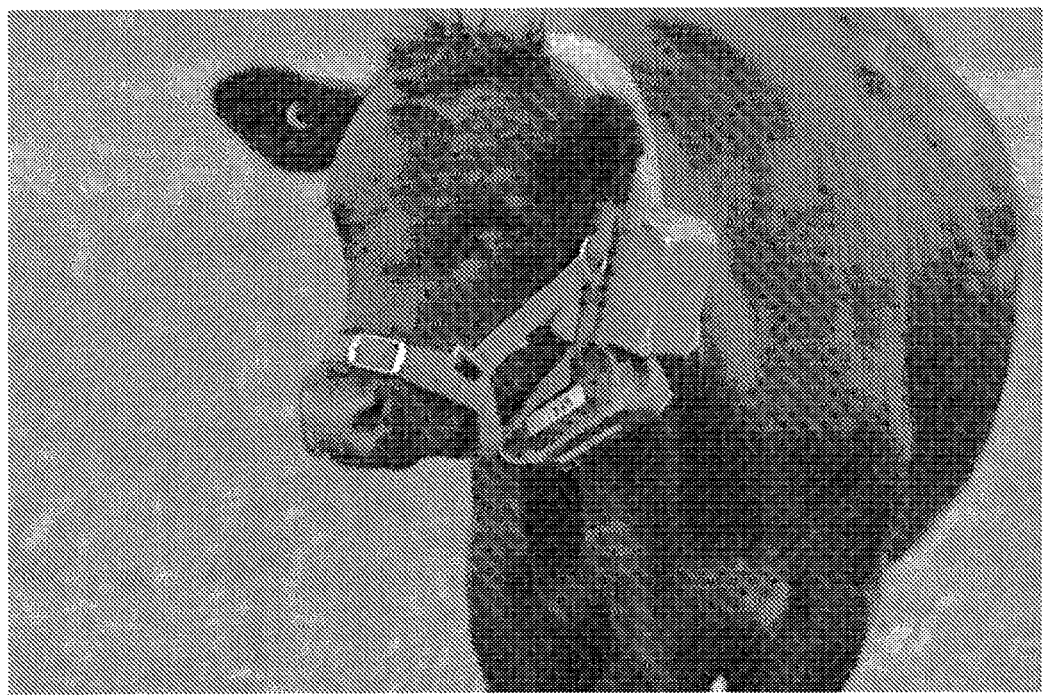
Figure 7A:
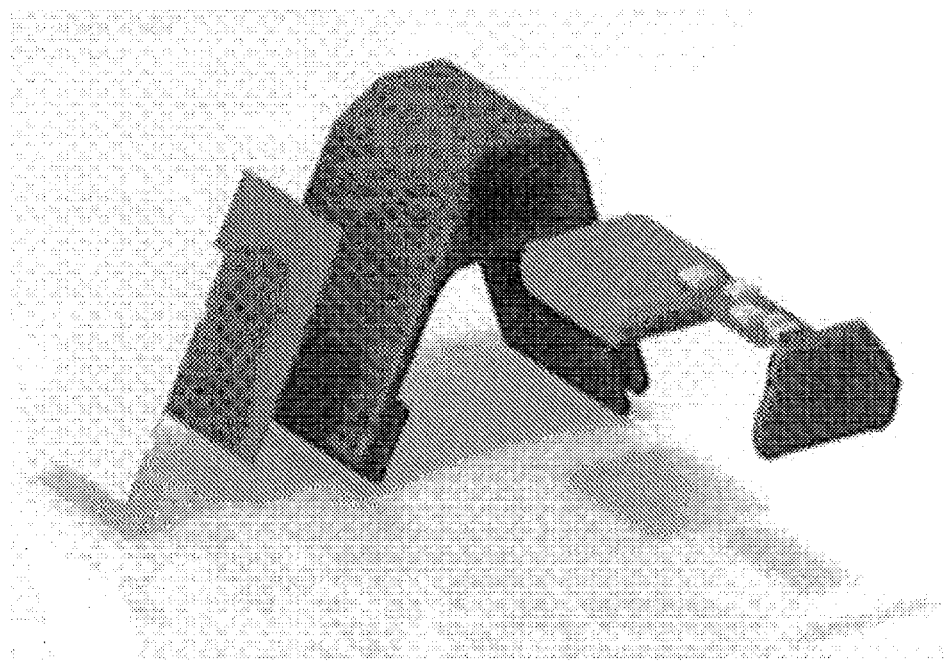
FIGS. 7a and 7b illustrate an example design of data collection device 120. In this example, solar cells on the device 120 provide the electrical energy for the data collection and transmission.
Figure 7B:
Figure 8:
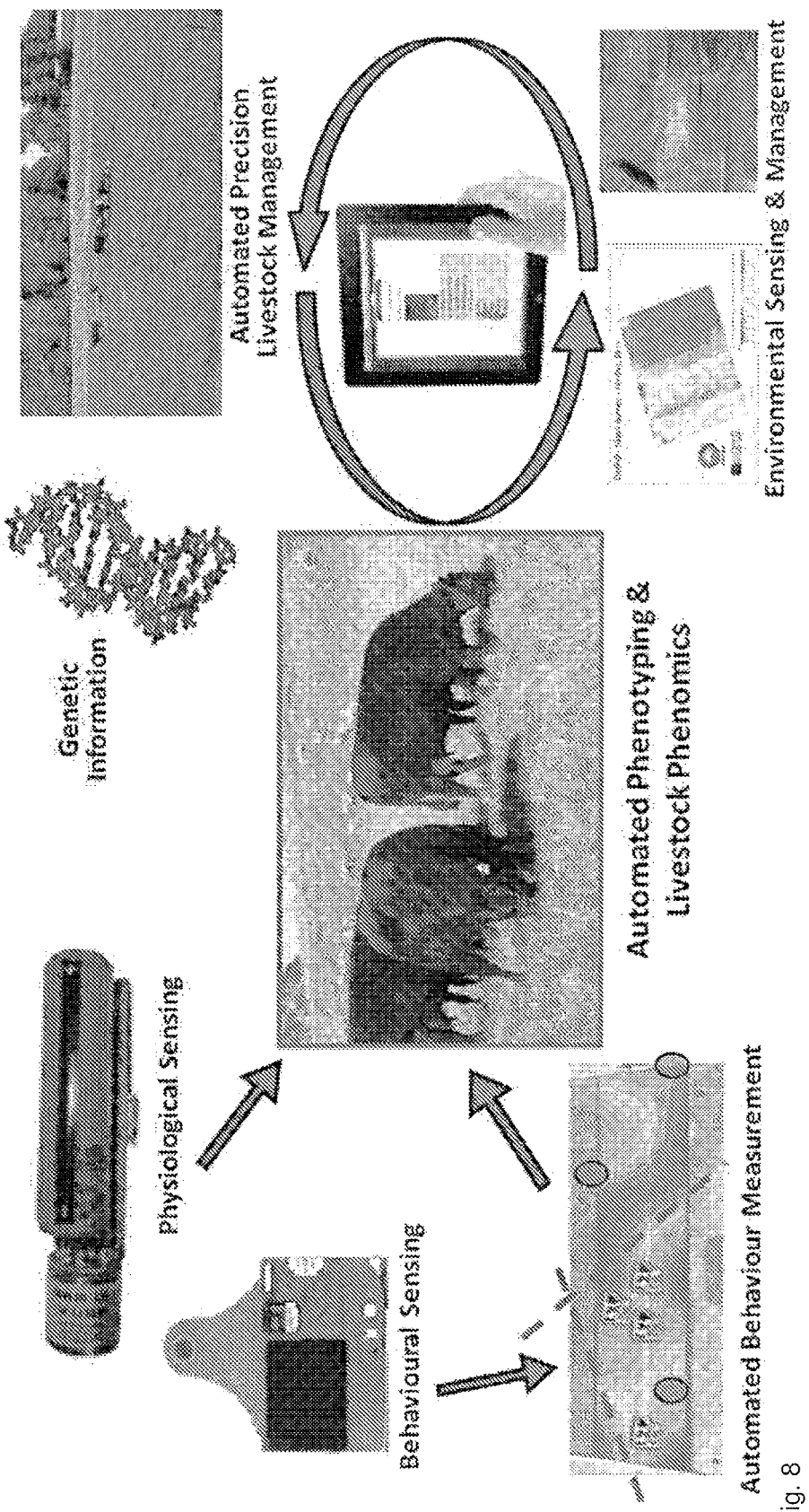
FIG. 8 illustrates a computer network for next generation phenotyping based on the determined pasture intake. In other words, the determined pasture intake serves as a quantitative trait and can be linked to bio markers including genetic markers for selective breeding.
Figure 9:
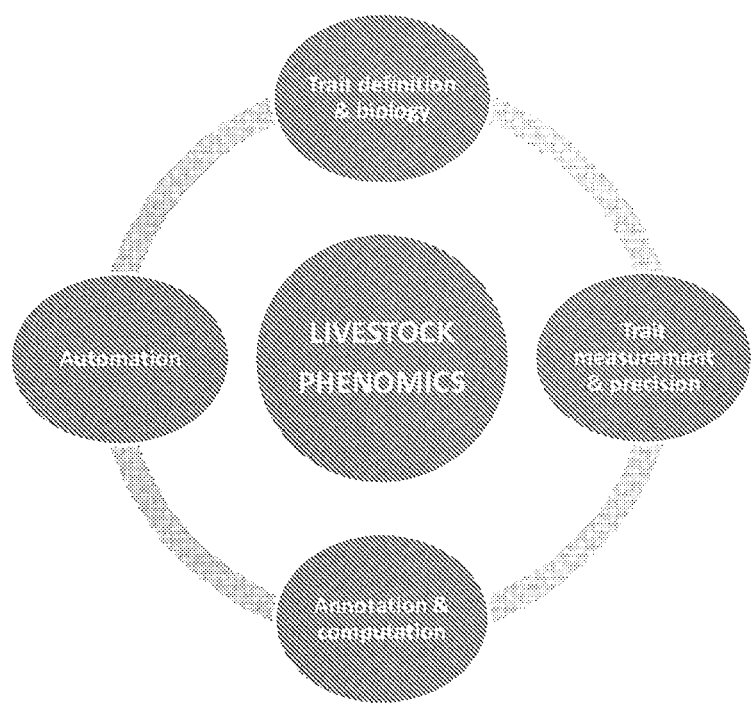
FIG. 9 illustrates a schematic of a livestock phenomics approach. Target Traits comprise one or more of Feed intake, efficiency & methane output at pasture Immunocompetence Adaptation & fitness Reproduction
Figure 10:
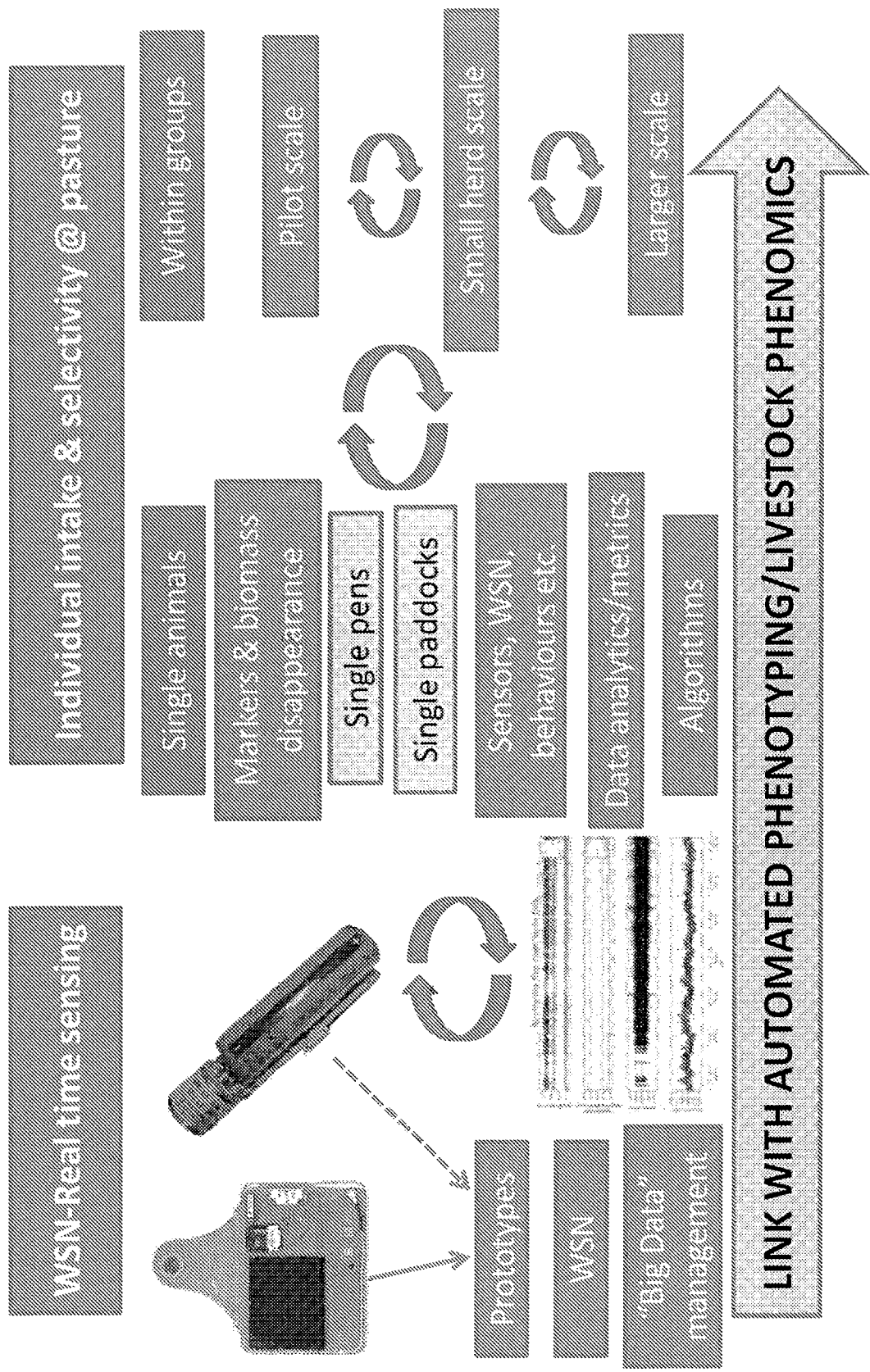
FIG. 10 illustrates a block diagram of a pasture intake project design.
Figure 11:
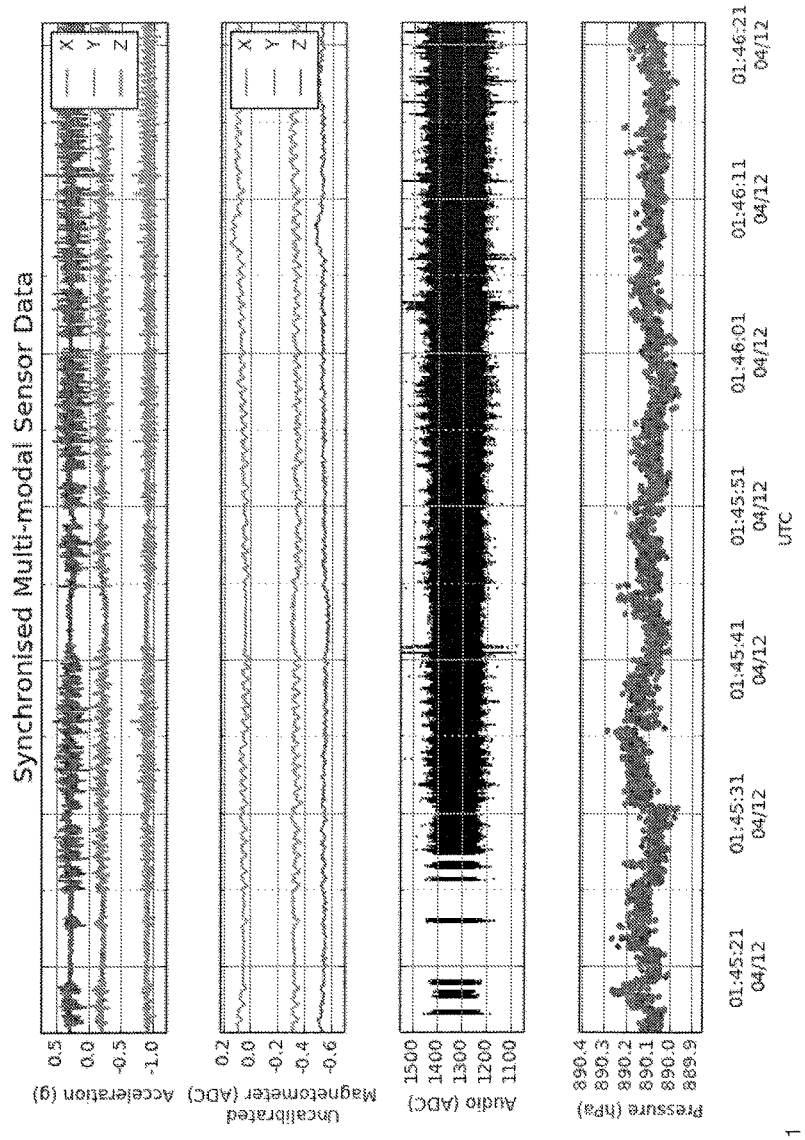
FIG. 11 illustrates example sensor data from data collection device. While the sensor data is shown as an analog signal, it is to be understood that the sensor data may be transmitted in digital form, such as an XML or JSON file or stream.
Figure 12:
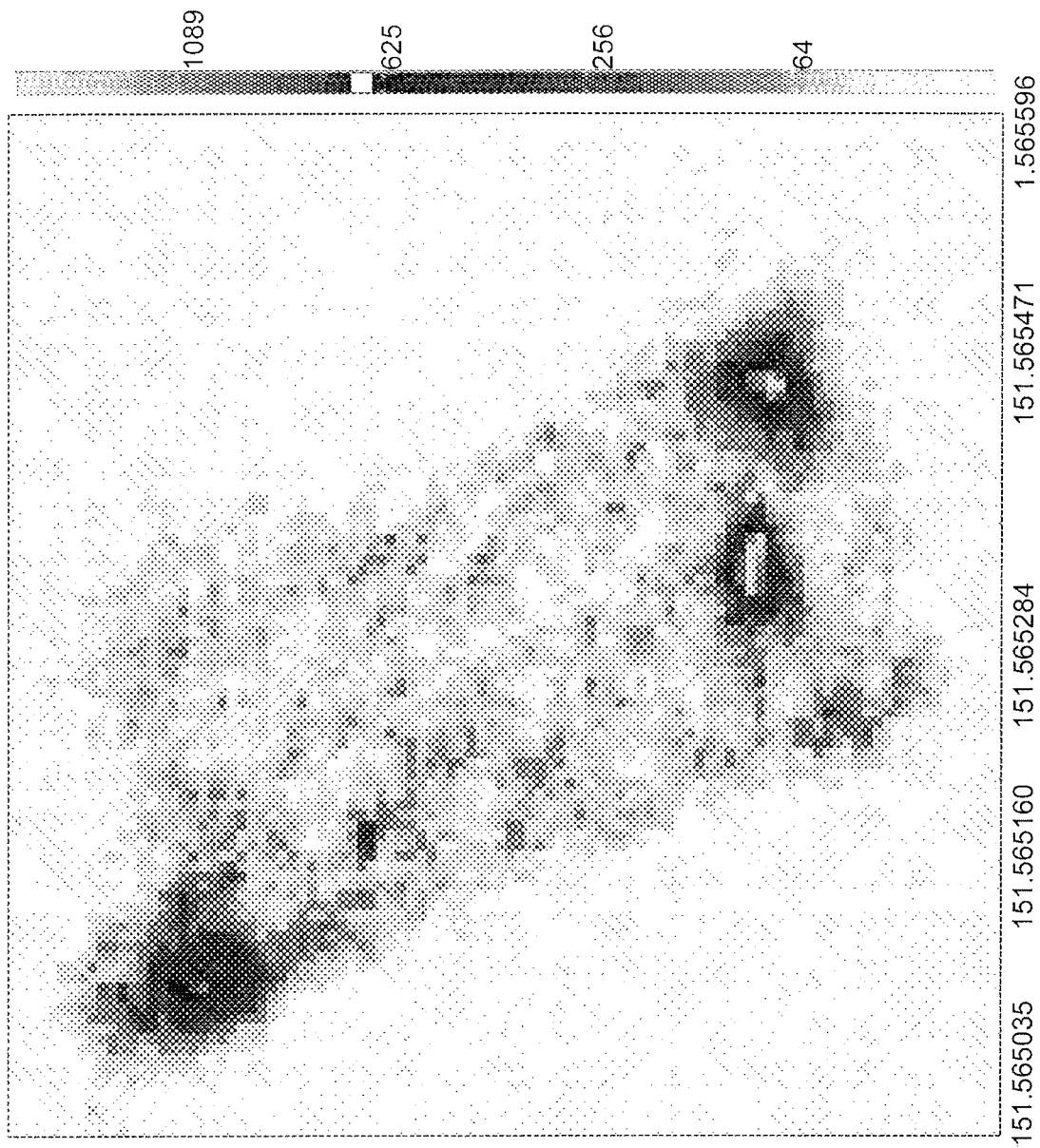
FIG. 12 illustrates a heat map of the location of the cattle across the plot that may be displayed on a user interface.
Figure 13:
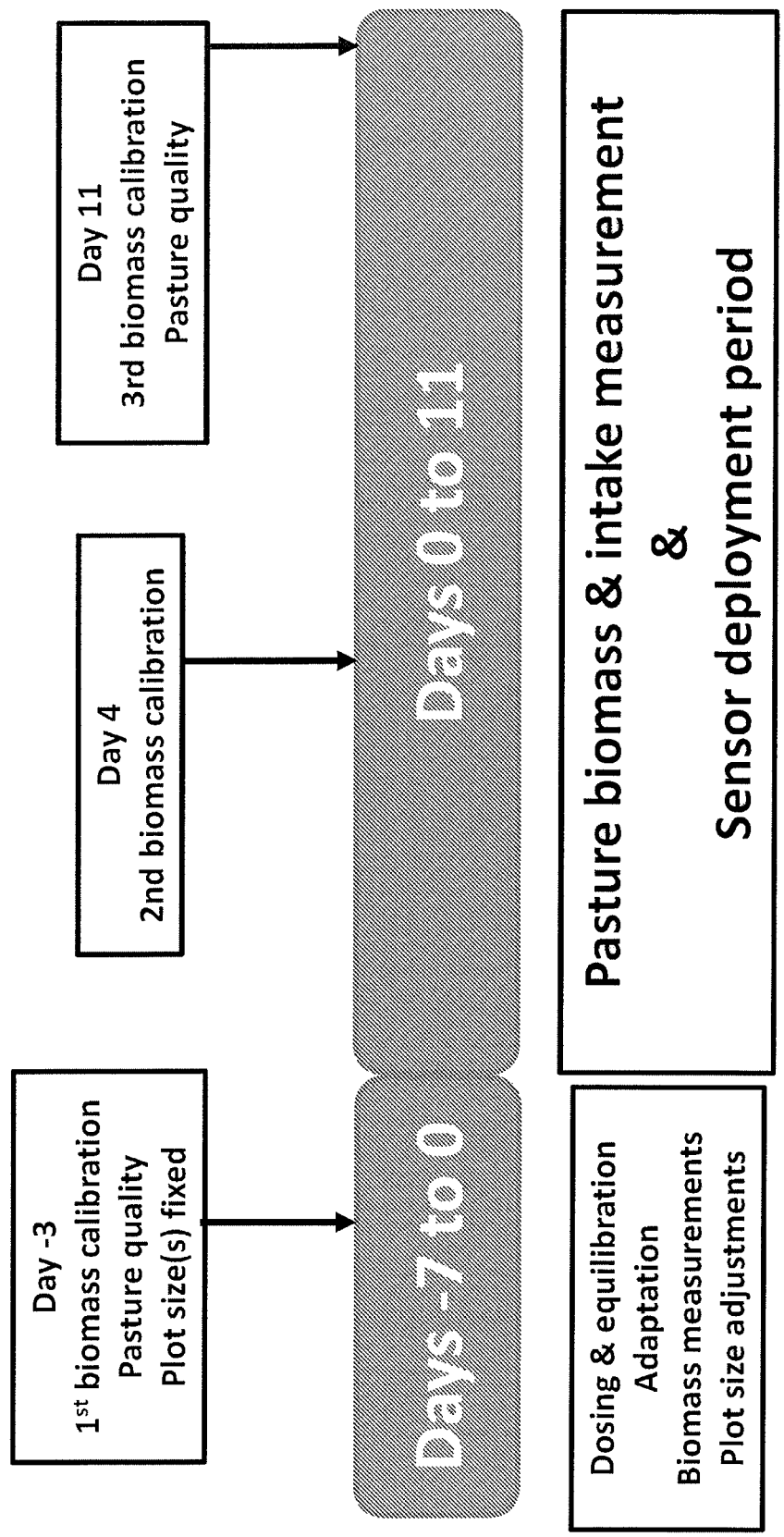
FIG. 13 illustrates an example timeline of pasture intake estimation.

Processor 102 may further generate a user interface for precision pasture management based on the pasture intake value. For example, FIG. 3 illustrates a user interface comprising an image of a feeding plot with superimposed numbers representing the determined pasture intake. Especially in cases where processor 102 monitors multiple animals, that is, determines a pasture intake value for each of multiple animals (by repeating method 200 in FIG. 2a for each animal), the overall pasture management based on the pasture intake value is effective. In other words, the pasture intake value can serve as an indicator of paddock status. For example, a reduction of pasture intake over time may indicate that the biomass availability is declining below an optimal level or minimum threshold and the stock should be moved to a different paddock. The pasture intake value may also indicate the preferences of the individual animals since a reduced pasture intake value may indicate that the animal prefers a different type of food, such as different plant varieties.

Animals and Training

Ten Angus steers with mean±SD live weight (LW) of 650±77 kg were used in the experiment (Table 1), five animals having 0 and five having 2 permanent teeth. During the 6 months or so prior to the experiment the steers were extensively handled, accustomed to halters and being tied up, whilst feeding from troughs and buckets while in yards. They were also trained to graze within plots divided by electric wires, and to enter and be restrained within 3×3 m pens for dosing, sampling and deployment of sensors.

Experimental Design and Pasture Plot Size Calculations

The experiment was designed to create variation in pasture intake by providing differing levels of high energy pelleted supplement to 3 groups of steers (Table 1). The High pasture intake treatment steers (n=3) received 1.0 kg pellets/d, the Medium pasture intake treatment steers (n=4) received pellets at a level of 0.75% of liveweight (LW), and the Low pasture intake steers (n=3) received pellets at a level of 1.5% LW. The 10 plots were randomly allocated to pasture intake treatment groups, steers randomly allocated to the pasture intake plots, then the pasture intake treatment groups balanced for LW (Table 1, mean±SD: Low 652±95 kg, Medium 651±90 kg and High 647±73 kg).

The size of each pasture plot for the pasture intake measurement period (Table 1) was calculated with the aim of matching pasture dry matter (DM)/ha and the rate of pasture DM decline across all 10 plots as closely as possible. Plot size calculations were based on estimated pasture availability at commencement of the pasture intake period, a target pasture biomass at the end of the intake period (1,000 kg DM/ha), length of the pasture intake period (11 d), pasture intake treatment, and steer LW, assuming total DM intake (DMI) by each steer from pasture plus pellets of 2.5% LW/d (Table 1):

Plot size (ha)=Total kg pasture DMI for 11 d÷(Estimated starting pasture DM in kg/ha−Target final pasture DM in kg/ha) where, Total kg pasture DMI for 11 d=Total kg DMI (2.5% LW/d×11 d)−Total kg pellet allowance ((90% DM×1.5% or 0.75% LW/d or 1 kg)×11 d))

Pasture Intake Plots and Management

Ten rectangular plots each of 0.5 ha (25×200 m) were sprayed with the herbicide, Glyphosate (460 g/L) at a rate of 2 L/ha to kill existing plant species. The lower 0.25 ha (25×100 m) of each plot was sown with Italian ryegrass (*Lolium multiflorum* cv. *Adrenalin*) at a seeding rate of 22 kg/ha by direct drilling in rows 14 cm apart in early winter. Di-ammonium phosphate was applied concurrently at a rate of 135 kg/ha. The plots were managed by grazing with 30 steers and/or mowing as necessary to keep pasture availability as even as possible across the plots up to a limit of approximately 3 t DM/ha. Pasture DM availability leading up to the pasture intake measurement period was assessed using a Farmtracker F200® electronic rising-plate meter (FARMWORKS Precision Farming Systems, Feilding, New Zealand) calibrated using an equation for grazed ryegrass from previous studies within the same plots. During a 1 week steer adaptation period prior to the pasture intake period, each grazing plot was reduced in size and located within the 0.25 ha of ryegrass to best match experimental specifications. The location of the grazing area within each plot was identified by measuring DM availability within five 20×25 m strips using the Farmtracker. The size of each plot was fixed 3 days prior to commencement of the pasture intake period.

Pasture Meter Calibrations

The Farmtracker, and a Utility Task Vehicle-towed C-Dax Pasture Meter XC1® (C-Dax Ltd, Palmerston North, New Zealand) that makes 200 pasture height readings/sec, were calibrated against dried pasture quadrat cuts taken three days prior to the start (d −3) and on d 4 and d 11 of the pasture intake period (Table 2). On each calibration day, 3 quadrats (50×50 cm) representative of low, medium and high pasture availability within each plot (total=30 quadrats/calibration day) were measured using the meters, then the pasture cut, bagged, weighed, dried and re-weighed to determine pasture DM/ha for each quadrat. A single Farmtracker reading, and three C-Dax readings at fixed locations along each quadrat from which an average was calculated, were made per quadrat. Pasture calibration regression equations were linear for each device on each calibration day (Table 2). The Farmtracker readings explained 73-79% of the variation in DM/ha, and the C-Dax 80-82%. The Farmtracker calibration equation on d 11 differed from the equations on d −3 and d 4, consistent with a rise in pasture height relative to DM availability after a rainfall event on d 9, and as also indicated from the pasture exclusion cage data on d 10 and d 11 (Supplementary FIG. 1).

Supplementation

Steers were gradually adapted to their full allowance of pellets (Table 1) over a one-week period. The pellets were Rumevite Sheep and Cattle Pellets (Ridley Corporation, Melbourne) with 10.6 MJ ME, 123 g CP and 168 g crude fibre per kg DM, and were fed in 42 L tubs to the steers at 0830 h and 1600 h each day. Low and Medium pasture intake steers were fed 40% of their allowance in the morning and 60% in the afternoon, and High pasture intake steers 0.5 kg of pellets at each feeding time, within 3×3 m pens adjacent to each plot. If all pellets were not consumed within 30 min, access to the remaining pellets was provided in the plots. Refusals were weighed daily and intake of pellets estimated as the allowance less refusals (Table 1).

Pasture Dry Matter Availability and Pasture Intake Estimates

Pasture DM/ha was measured commencing at approximately 1100 h with the Farmtracker every day and with the C-Dax every 2 or 3 days. Farmtracker measurements were made every 2 steps along 4 to 6 zig-zag pattern transects depending on plot length, to generate a plot mean. Measurements were then made in the reverse direction within each plot to duplicate plot values. Approximately 140 to 280 Farmtracker measurements were made per plot/d. The average coefficient of variation between duplicates was 4.6%, ranging from 2.8 to 7.2% per plot across the entire pasture intake period. The C-Dax pasture height measurements were made on 6 occasions across the pasture intake period by measuring pasture height continuously along 4 longitudinal transects and turns spanning each plot. The C-Dax measurements were not replicated and were made every 2 or 3 days to limit compression of pasture. The correlation between the Farmtracker and C-Dax estimates of pasture biomass at the start of the intake period was 0.98 ($P<0.001$) and at the end was 0.88 ($P<0.001$).

Calibration equations from the data on d −3 and d 4 were used to estimate pasture DM availability up to day 9, and the calibration equation from the data on d 11 and the pasture cage data were used to estimate pasture DM availability on d 10 and d 11. To estimate pasture re-growth during the pasture intake period, 15 quadrats within exclusion cages were placed across the plots to approximate the range of pasture availability at the start of the intake period. Measurements were made daily at approximately 1300 h using the Farmtracker. Depending on the measured amount of regrowth, it was planned to deploy additional quadrats within exclusion cages, however dry conditions up to d 9 resulted in no measurable regrowth across most of the pasture intake period (Supplementary FIG. 1). Estimates of the area within plots comprising faeces deposited during the pasture intake period were less than 1% hence pasture intake estimates were not adjusted for faecal contamination.

Daily pasture DMI by each steer was estimated from Farmtracker and C-Dax estimates of DM/ha for each plot on each day measured, as the slope of the regression of pasture DM/ha on day across the entire 11 d pasture intake period multiplied by plot size. In all plots the decline in pasture biomass was linear (Table 3 and Supplementary Table 2).

Other Pasture Characteristics

Pooled dried pasture samples were made from the 3 quadrat cuts from each plot at the beginning and at the end of the pasture intake period. The proportion of green leaf, green stem and dead material, and ratios of green leaf to stem and green to dead (Supplementary Table 1) were determined in representative sub-samples. Representative sub-samples from each plot at the start and end of the intake period have also been analysed for nutritional value, details of which are available on request.

Sensor Deployment and Behaviour Classification

Electronic cattle monitoring collars that included 3-axis accelerometers programmed to collect data at 10 Hz (862, 500 data points/d) (Wark et al. 2007; Gonzales et al. 2015) were deployed on all 10 steers on d 0 of the pasture intake period and remained on the steers until conclusion of the pasture intake period on d 11. It is noted that 10 Hz is just an example and other sampling rates may be used. The amount of accelerometer data obtained from the devices to enable classification of and time spent exhibiting behaviours was 8.7±3.2 d (mean±SD), ranging from 3 to 11 d.

A cattle behaviour model was used to continuously classify the behaviour of each animal across consecutive, non-overlapping time intervals, such as 15 sec or similar, spanning the duration of the pasture intake period. The model used observations from the accelerometer fitted to the neck of each animal within the collars to discriminate between five different cattle behaviours based on their respective motion patterns and head orientation. The five behaviours classified were Grazing, Ruminating, Resting, Walking and an aggregated class of all 'Other' less frequent behaviours.

In a further example, the accelerometer is mounted on or near the cheek of the animal, such as on a halter or mounted on the ear of the animal such as on a tag. More generally, the accelerometer may be mechanically coupled to the jaw or cheek of the animal, such that movement of the jaw or cheek results in movement of the accelerometer. For example, the halter may couple the movement of the jaw or cheek mechanically to the accelerometer even in cases were the accelerometer does not immediately abut the cheek of the animal.

The behaviour model comprised a set of five independent classifiers that each discriminate a target behaviour from a second combined class of the remaining four behaviours. These binary classifiers were developed for each of the target behaviours. Behavioural classification was then performed by identifying the binary classifier with the maximum posterior probability (i.e. highest classification confidence) for its target behaviour. The advantage of using a set of binary classifiers is that it decomposes the multi-class problem into a set of simpler problems. It also enabled the configuration of each classifier (with respect to input features, time interval and classifier type) to be tailored to the motion and orientation characteristics associated with the respective target behaviour.

Behaviour model development and classification. There were two separate stages in the application of cattle behaviour classifiers. The first involved developing the model by training each binary classifier with example instances (sensor inputs and their corresponding class behaviours) in order to construct functions for class decision boundaries.

Pre-processing of inertial sensor data. Six time series comprising the three axes of the accelerometer, the pitch and roll orientation (derived from the accelerometer as described by Pedley 2013), and the absolute magnitude of the 3-axis accelerometer may be used by processor 102 to develop the behaviour classifier. The time series may be initially processed to reduce effects that could degrade future analyses. The measured acceleration and orientation time series may be highly correlated, which may be problematic for machine learning methods that assume inputs are statistically independent. To reduce this correlation, processor 102 may separate the cattle motion from gravity in the acceleration vectors by assuming that the device orientation changes slowly enough to enable gravity to be approximated by the low frequency component of the measured acceleration. Hence, the desired animal acceleration can be estimated by applying a high pass Finite Impulse Response (FIR) filter to the 3-axis accelerometer at 0.3 Hz.

Feature extraction and selection. Each of the six time series may be partitioned to represent cattle behaviour over short time intervals of 15 sec. A set of 14 features derived from the sensor data, described previously by Smith et al. (2015b), may be extracted from each interval in each of the raw time series. The 14 features from the corresponding time intervals of the six time series may then be concatenated to produce an input instance of 84 features. The feature set may be categorised into three distinct groups; statistical, spectral and information theory. Embedded feature selection (Guyon and Elisseeff 2003) may then be employed during the training of each classifier to identify the subset of features (from the complete set of 84 features) that offered the greatest contribution to the binary classification task. The highest contributing features for each of the behaviour classes were then used to train their respective binary classifier.

Figure 16:
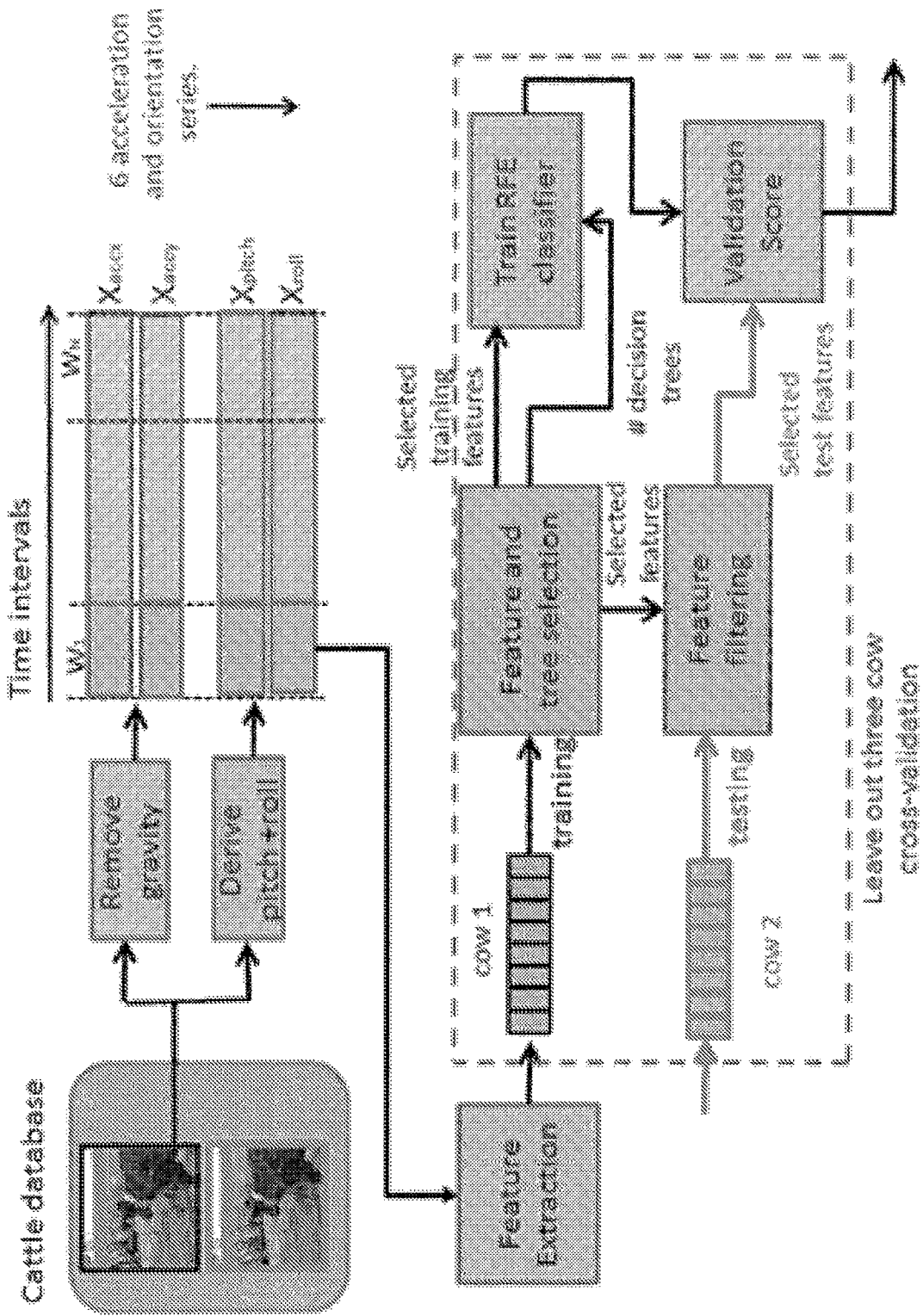
FIG. 16 illustrates a process to train and validate the performance of binary classifiers. The accelerometer series are pre-processed to derive six motion and orientation series. These series are partitioned into short time intervals.

Training and validation of binary classifiers. The process used to train and validate performance of the binary classifiers is shown in FIG. 16. The classifier used to model each of the binary classification decisions may be Random Forest (RF) (Breiman 2001). The RF is an ensemble of decision tree classifiers that were each trained as part of a bootstrap aggregation method. Training instances and features may be randomly sampled (with replacement) to train each of the constituent decision trees. The classifications produced by the trees may then be averaged in order to infer the behaviour associated with each input instance.

Leave three animal out cross-validation may be performed to train and then evaluate the performance of the binary RF classifiers. The 'Leave out p' (LOP) cross validation (Shao 1993) method was used to ensure that the training and validation data sets were constructed with the sensor observations of different animals. The LOP validation was considered the best approach to evaluate the ability of behaviour models to generalise to newly instrumented cattle that were not considered in training. The approach may be implemented by selecting three animals to validate the performance of the RF classifier, and training the classifier with the remaining 20 cattle. The process may be repeated on eight occasions (eight folds) to ensure the classification performance of each of the 23 cattle was only validated on a single occasion.

The performance of the classifiers was evaluated across all eight cross-validation folds using the recall (R), precision (P) and F-score metrics:

$$F = (2 \times P \times R)/(P+R)$$

$$P = truepos/(falsepos+truepos)$$

$$R = truepos/(falseneg+truepos)$$

where, truepos is the number of instances from the current behaviour class that were correctly classified, falsepos is the number of instances from another behaviour class that were incorrectly classified as the current behaviour class, and falseneg is the number of instances belonging to the current behaviour class that were classified as another behaviour. The F-score statistic was the harmonic mean of the precision and recall with a value ranging between 0 and 1; a value of 1 was indicative of ideal classification performance.

Statistical Analyses

Mean pasture DMI per day may be determined from the slope of linear regression equations for each plot for each pasture measurement meter (Farmtracker and C-Dax, Supplementary Table 2). Polynomial regression analyses (DM kg/ha=constant+intake day+intake day$^2$) resulted in non-significant quadratic terms.

Significance of effects of treatment (Low, Medium or High pasture intake) and pasture measurement meter on pasture availability, disappearance, and DMI and on behaviour measurements were tested using analyses of variance, and differences between means using LSD values. Starting and final pasture biomass, LW, dentition and width across the incisors were also included in analyses as covariates.

The relationships between pasture DMI and sensor derived behaviour classifications may be determined by regressing average time (h/d) in each behaviour class on average pasture DMI (kg/d). Multiple regression analyses did not identify algorithms within which pasture DMI was significantly associated with multiple behaviours. Starting pasture biomass availability, LW, dentition and width across the incisors were also assessed by regression analyses, and did not have significant effects.

Statistical analyses were performed using Genstat 16 (VSN International, Hemel Hempstead, UK). Significance of relationships and effects were accepted at P<0.05.

Results

Pasture Biomass Estimates and Other Characteristics

Average pasture heights measured using the C-Dax declined from (mean±SD) 107±9.5 mm to 65±10.7 mm and using the Farmtracker from 20.1±1.46 cm to 14.6±1.47 cm over the duration of the pasture intake period. Estimates of starting and final pasture biomass did not differ (P>0.38) due to pasture intake treatment (Table 3). Rate of pasture biomass decline did not differ when estimated using the Farmtracker (P=0.20), although tended to be greater in the Medium than in the Low and High pasture intake steers (P=0.050) when estimated using the C-Dax. Significant differences due to pasture intake treatments were not evident for green leaf, green stem, total green and dead components of the pasture plots, or in the ratios of green to dead and green leaf to stem (P>0.11, Supplementary Table 1).

Pasture Intake Estimates

Estimates of pasture intake did not differ between the Farmtracker and the C-Dax (12.0 vs 11.0 kg DM/d, respectively, SED=1.21 kg DM/d, P=0.22, Table 3). The correlation between pasture DM estimates using the two meters was 0.94 (P<0.001), and between the rankings of DMI was 0.92 (P<0.001). There was a significant effect of pasture intake treatment on pasture DMI as estimated using both Farmtracker (P=0.020) and C-Dax (P=0.006) (Table 3). The Low pasture intake steers consumed significantly less pasture than their High counterparts, with the Medium steers consuming intermediate amounts (Table 3), consistent with our approach to creating variation in pasture intake by substitution with pellets. When analysed within an analysis of covariance model, time spent Grazing ($r^2$=0.50, P=0.001), width across the incisors ($r^2$=0.18, P=0.005), dentition ($r^2$=0.06, P=0.023) and starting pasture biomass ($r^2$=0.09, P=0.013) also significantly affected C-Dax pasture DMI estimates, with starting and final pasture biomass explaining similar amount of variation. The effect of LW was not significant ($r^2$≤0.02, P>0.08). Of these variables, only time spent Grazing ($r^2$=0.46, P=0.025) had a significant affect when analysed as a covariate to assess effects of pasture intake treatment on the Farmtracker estimates of pasture DMI.

Behavioural Classification

The classification results from the leave three animal out cross validation are presented Table 4. Grazing was identified with a high degree of accuracy as the behaviour possessed both a unique head orientation (the head was positioned down) and motion pattern relative to the other four behaviours. Ruminating and resting were also identified with a good level of accuracy with F-scores above 0.8. The classification accuracy of the aggregated 'Other' class was poor. This was expected given it was comprised of a number of different activities (i.e. urinating, grooming) that each possess very different motion characteristics. These different activities were aggregated into a single class given there were very few instances of each activity to train separate classes and these activities were not of importance to the present study.

Time Displaying Behaviours

The amount and percentage of time spent displaying the classified behaviours are presented in Table 5. The High pasture intake steers tended to spend more time Grazing than the Low pasture intake steers (P=0.091). The Low pasture intake steers tended to spend more time Resting than the Medium and High pasture intake steers (P=074). Time spent displaying Ruminating, Walking and Other behaviour classes did not differ due to pasture intake treatment (P>0.27). One animal (steer 4) spent more time exhibiting the Other behavioural class than the rest of the steers, the reason for which is not known.

Algorithms Predicting Pasture Intake

There was a significant relationship between the amount of time spent Grazing per day and pasture DMI/d as estimated by both the Farmtracker and the C-Dax meters (Table 6). The C-Dax estimates of pasture DMI resulted in a better fit with time spent Grazing (RSD=1.66 kg DM/d, $r^2$=0.59) than did the Farmtracker estimates of pasture DMI (RSD=1.85 kg DM/d, $r^2$=0.39). There was also a significant relationship between time spent Resting and pasture DMI estimated using the C-Dax, and a tendency towards a significant relationship between time spent Resting and pasture DMI estimated using the Farmtracker (Table 6). A significant relationship between time spent Grazing and DMI as a percentage of LW (% LW) was also evident (Table 6). Relationships between pasture DMI and time spent Ruminating, Walking or in the Other classification were not evident (P>0.42), nor were there any significant relationships with starting or final pasture DM/ha, LW, dentition or width across the incisors when analysed by regression (P>0.23).

TABLE 1

Live weight (LW), pasture intake treatment group, plot size, dry matter intake (DMI) of pellets, mean estimated pasture DMI, and estimated total DMI for each steer within individual grazing plots over an 11 d pasture intake period. Pasture DMI estimates are means calculated from Farmtracker rising-plate meter and C-Dax pasture height meter estimates of pasture disappearance (see Table 3 and Supplementary Table 2).

| Variable | Plot and steer number | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Pasture intake treatment | Low | Med | Low | Med | Med | High | Low | High | Med | High |

TABLE 1-continued

Live weight (LW), pasture intake treatment group, plot size, dry
matter intake (DMI) of pellets, mean estimated pasture DMI, and estimated total DMI
for each steer within individual grazing plots over an 11 d pasture intake period.
Pasture DMI estimates are means calculated from Farmtracker rising-plate meter and
C-Dax pasture height meter estimates of pasture disappearance (see Table 3 and
Supplementary Table 2).

| | Plot and steer number | | | | | | | | | |
|---|---|---|---|---|---|---|---|---|---|---|
| Variable | 1 | 2 | 3 | 4 | 5 | 6 | 7 | 8 | 9 | 10 |
| LW (kg) | 558 | 627 | 651 | 780 | 627 | 683 | 748 | 695 | 571 | 563 |
| Plot size (ha) | 0.100 | 0.146 | 0.125 | 0.180 | 0.146 | 0.212 | 0.125 | 0.218 | 0.134 | 0.175 |
| Supplement level (% LW or 1 kg/d) | 1.50 | 0.75 | 1.50 | 0.75 | 0.75 | 1 kg | 1.50 | 1 kg | 0.75 | 1 kg |
| Supplement allowance (kg DM/d) | 7.3 | 4.1 | 8.7 | 5.1 | 4.1 | 0.9 | 9.8 | 0.9 | 3.8 | 0.9 |
| Supplement refusals (kg DM/d) | 0.7 | 0.0 | 2.0 | 0.0 | 0.0 | 0.0 | 0.7 | 0.0 | 0.0 | 0.0 |
| Supplement DMI (kg DM/d) | 6.6 | 4.1 | 6.7 | 5.1 | 4.1 | 0.9 | 9.2 | 0.9 | 3.8 | 0.9 |
| Mean pasture DMI (kg/d) | 7.5 | 11.4 | 9.9 | 14.0 | 11.2 | 14.7 | 8.5 | 14.4 | 9.7 | 12.1 |
| Mean pasture DMI (% LW/d) | 1.35 | 1.82 | 1.51 | 1.79 | 1.78 | 2.16 | 1.14 | 2.07 | 1.70 | 2.15 |
| Total DMI (kg/d) | 14.1 | 15.5 | 16.6 | 19.1 | 15.3 | 15.6 | 17.7 | 15.3 | 13.5 | 13.0 |
| Total DMI (% LW/d) | 2.53 | 2.47 | 2.55 | 2.44 | 2.44 | 2.28 | 2.36 | 2.20 | 2.36 | 2.31 |

TABLE 2

Farmtracker rising-plate meter and C-DAX pasture height meter calibration
equations for biomass (kg DM/ha) of Italian ryegrass (*Lolium multiflorum* Cv.
*Adrenalin*) from pasture quadrat cuts (n = 30/d, all P < 0.001).

| Device | Intake day | Quadrat mean ± SD (kg DM/ha) | Pasture meter mean ± SD | Intercept (kg DM/ha) | Slope (kg DM/ha) | RSD (kg DM/ha) | $r^2$ |
|---|---|---|---|---|---|---|---|
| Farmtracker | −3 | 1808 ± 1070 | 20.2 ± 8.0 cm | −512.9 | 114.7 | 555.9 | 0.74 |
| | 4 | 1783 ± 1025 | 19.2 ± 7.7 cm | −492.5 | 117.7 | 487.7 | 0.79 |
| | 11 | 1291 ± 739 | 18.6 ± 7.1 cm | −363.5 | 89.1 | 394.4 | 0.73 |
| C-Dax | −3 | 1808 ± 1070 | 114 ± 55 mm | −220.1 | 17.75 | 465.3 | 0.82 |
| | 4 | 1783 ± 1025 | 105 ± 50 mm | −167.6 | 18.43 | 470.3 | 0.80 |
| | 11 | 1291 ± 739 | 77 ± 33 mm | −259.6 | 20.14 | 326.9 | 0.81 |

Table 3. Pasture intake treatment means for plot size, starting and final pasture biomass, rate of pasture disappearance, estimated pasture dry matter intake (DMI), residual standard deviation (RSD) and the coefficient of determination (r2) derived from the regression of pasture biomass on day for each grazed plot and measurement device (see Supplementary Table 2). Mean values with different letters differ (P<0.05).

FIG. 14 illustrates the performance of the behaviour class model for the leave out 3 cattle cross validation. The precision is the fraction of behaviour class estimates that truly belong to that class, the recall is the fraction of behaviour class instances that are correctly estimated, and the F-score is the harmonic mean of the precision and recall.

| Behaviour | Precision | Recall | F-score |
|---|---|---|---|
| Grazing | 0.96 | 0.99 | 0.97 |
| Ruminating | 0.81 | 0.91 | 0.86 |
| Walking | 0.75 | 0.67 | 0.71 |
| Resting | 0.93 | 0.73 | 0.83 |
| Other | 0.40 | 0.24 | 0.32 |

TABLE 5

Pasture intake treatment means for time spent by steers (h/d) exhibiting behaviour classes. Behaviours were classified from collar mounted accelerometer data as described in the Sensor Deployment and Behavioural Classification sub-section of the Materials and Methods.

| Behaviour class | | Pasture intake treatment | | | Average SED | P-value |
|---|---|---|---|---|---|---|
| | | Low (n = 3) | Medium (n = 4) | High (n = 3) | | |
| Grazing | h/d | 5.84 | 6.86 | 7.12 | 0.499 | 0.091 |
| | (%/d) | (24.3) | (28.6) | (29.7) | | |
| Ruminating | h/d | 6.2 | 7.2 | 7.5 | 0.751 | 0.273 |
| | (%/d) | (25.8) | (30.0) | (31.3) | | |
| Walking | h/d | 0.34 | 0.50 | 0.38 | 0.107 | 0.327 |
| | (%/d) | (1.40) | (2.08) | (1.60) | | |
| Resting | h/d | 11.4 | 8.5 | 8.8 | 1.112 | 0.074 |
| | (%/d) | (47.3) | (35.5) | (36.8) | | |
| Other | h/d | 0.28 | 0.94 | 0.15 | 0.687 | 0.474 |
| | (%/d) | (1.17) | (3.93) | (0.63) | | |

TABLE 6

Daily pasture dry matter intake (DMI) prediction algorithms generated using DMI estimates from the Farmtracker electronic rising plate meter and the C-Dax pasture height meter for 10 steers, and mean values from the two devices. The algorithm predicting daily pasture DMI as % of live weight (LW) was equivalent for DMI estimated using the two devices.

| Device | Prediction algorithm | RSD | P-value | $r^2$ |
|---|---|---|---|---|
| Farmtracker | DMI (kg/d) = −1.70 + 2.023 × grazing (h/d) | 1.85 kg DM/d | 0.032 | 0.39 |
| | DMI (kg/d) = 18.5 − 0.720 × resting (h/d) | 2.10 kg DM/d | 0.098 | 0.22 |
| C-Dax | DMI (kg/d) = −6.46 + 2.614 × grazing (h/d) | 1.66 kg DM/d | 0.006 | 0.59 |
| | DMI (kg/d) = 19.5 − 0.909 × resting (h/d) | 2.13 kg DM/d | 0.048 | 0.33 |
| Mean | DMI (kg/d) = −4.13 + 2.325 × grazing (h/d) | 1.65 kg DM/d | 0.010 | 0.53 |
| | DMI (kg/d) = 19.0 − 0.817 × resting (h/d) | 2.01 kg DM/d | 0.058 | 0.30 |
| All | DMI (% LW/d) = −0.114 + 0.280 × grazing (h/d) | 0.259% LW/d | 0.033 | 0.38 |

Supplementary TABLE 1

Pasture characteristics across the pasture intake measurement period.

| Plot | Pasture intake treatment | Green leaf (%) | | Green stem (%) | | Green (%) | | Dead (%) | | Green: Dead | | Green Leaf: Stem | |
|---|---|---|---|---|---|---|---|---|---|---|---|---|---|
| | | d −3 | d 11 | d −3 | d 11 | d −3 | d 11 | d −3 | d 11 | d −3 | d 11 | d −3 | d 11 |
| 1 | Low | 27.1 | 11.8 | 64.9 | 57.1 | 92.0 | 68.9 | 8.0 | 31.1 | 11.5 | 2.2 | 41.8 | 20.7 |
| 2 | Med | 29.8 | 15.4 | 66.0 | 53.8 | 95.8 | 69.2 | 4.2 | 30.8 | 22.8 | 2.3 | 45.1 | 28.6 |
| 3 | Low | 38.0 | 16.4 | 50.4 | 54.3 | 88.4 | 70.7 | 11.6 | 29.3 | 7.6 | 2.4 | 75.4 | 30.2 |
| 4 | Med | 27.6 | 15.5 | 69.3 | 46.9 | 96.9 | 62.4 | 3.1 | 37.6 | 31.6 | 1.7 | 39.8 | 33.0 |
| 5 | Med | 21.0 | 17.7 | 71.4 | 52.0 | 92.3 | 69.8 | 7.7 | 30.2 | 12.1 | 2.3 | 29.4 | 34.1 |
| 6 | High | 17.4 | 6.4 | 73.3 | 60.6 | 90.7 | 67.1 | 9.3 | 32.9 | 9.8 | 2.0 | 23.8 | 10.6 |
| 7 | Low | 23.1 | 10.8 | 71.7 | 53.4 | 94.8 | 64.3 | 5.2 | 35.7 | 18.3 | 1.8 | 32.2 | 20.3 |
| 8 | High | 15.2 | 6.8 | 73.6 | 42.8 | 88.8 | 49.6 | 11.2 | 50.4 | 8.0 | 1.0 | 20.7 | 15.9 |
| 9 | Med | 29.7 | 10.8 | 65.3 | 53.2 | 95.0 | 64.0 | 5.0 | 36.0 | 18.9 | 1.8 | 45.6 | 20.3 |
| 10 | High | 27.2 | 16.2 | 69.3 | 66.8 | 96.5 | 83.0 | 3.5 | 17.0 | 27.6 | 4.9 | 39.3 | 24.3 |
| Mean | Low | 29.4 | 13.0 | 62.3 | 54.9 | 91.7 | 68.0 | 8.3 | 32.0 | 12.5 | 2.1 | 49.8 | 23.7 |
| | Med | 27.0 | 14.9 | 68.0 | 51.5 | 95.0 | 66.4 | 5.0 | 33.7 | 21.4 | 2.0 | 40.0 | 29.0 |
| | High | 19.9 | 9.8 | 72.1 | 56.7 | 92.0 | 66.6 | 8.0 | 33.4 | 15.1 | 2.6 | 27.9 | 16.9 |
| Av. SED | | 4.69 | 3.02 | 4.88 | 5.50 | 2.37 | 7.36 | 2.37 | 7.36 | 6.55 | 0.87 | 11.04 | 4.91 |
| P-value | | 0.20 | 0.29 | 0.23 | 0.62 | 0.33 | 0.97 | 0.33 | 0.97 | 0.40 | 0.77 | 0.23 | 0.11 |

Supplementary TABLE 2

Farmtracker rising-plate meter and C-DAX pasture height meter predictions for starting biomass (intercept) and rate of biomass disappearance (slope) of Italian ryegrass (*Lolium muluflorum* Cv. *Adrenalin*) over the duration of the pasture intake period, final biomass (calculated from the intercept and slope) and daily pasture dry matter intake (DMI) estimates (calculated from the plot size and the slope). The residual standard deviation (RSD) and the coefficient of determination ($r^2$) for the regression model for each grazed plot and measurement device are also shown. Mean values with different letters differ significantly ($P < 0.05$).

| | | | Values from regression models | | | | | |
|---|---|---|---|---|---|---|---|---|
| Plot and Steer | Pasture Intake treatment | Plot size (ha) | Starting biomass (kg DM/ha) | Biomass disappearance (kg DM/ha/d) | Final biomass (kg DM/ha) | RSD (kg DM/ha) | r2 | Estimated pasture DMI (kg/d) |
| Farmtracker electronic rising plate meter | | | | | | | | |
| 1 | Low | 0.100 | 1958 | −80.2 | 1076 | 92.9 | 0.91 | 8.0 |
| 2 | Medium | 0.146 | 1959 | −79.7 | 1082 | 103.6 | 0.89 | 11.6 |
| 3 | Low | 0.125 | 1948 | −85.0 | 1013 | 95.9 | 0.91 | 10.6 |
| 4 | Medium | 0.180 | 1789 | −78.6 | 924 | 80.0 | 0.93 | 14.2 |
| 5 | Medium | 0.146 | 1897 | −85.1 | 961 | 91.5 | 0.92 | 12.4 |
| 6 | High | 0.212 | 1615 | −74.6 | 794 | 90.1 | 0.90 | 15.8 |
| 7 | Low | 0.125 | 1571 | −70.0 | 801 | 86.3 | 0.90 | 8.7 |
| 8 | High | 0.218 | 1642 | −74.0 | 828 | 80.8 | 0.92 | 16.1 |
| 9 | Medium | 0.134 | 1633 | −76.5 | 792 | 98.4 | 0.89 | 10.3 |
| 10 | High | 0.175 | 1848 | −68.5 | 1095 | 69.6 | 0.93 | 12.0 |
| Mean | Low | 0.117c | 1826 | −78.4 | 963 | 91.7 | 0.91 | 9.13b |
| | Medium | 0.152b | 1820 | −80.0 | 940 | 93.4 | 0.91 | 12.11ab |
| | High | 0.202a | 1702 | −72.4 | 906 | 80.2 | 0.92 | 14.64a |
| Av. SED | | 0.0153 | 129.1 | 3.97 | 110.0 | 7.06 | 0.034 | 1.392 |
| P-value | | 0.003 | 0.595 | 0.200 | 0.882 | 0.201 | 0.703 | 0.020 |
| C-Dax pasture height meter | | | | | | | | |
| 1 | Low | 0.100 | 1946 | −70.4 | 1172 | 103.4 | 0.91 | 7.0 |
| 2 | Medium | 0.146 | 1939 | −77.1 | 1091 | 129.5 | 0.88 | 11.3 |
| 3 | Low | 0.125 | 1973 | −71.5 | 1187 | 147.0 | 0.84 | 8.9 |
| 4 | Medium | 0.180 | 1747 | −79.6 | 972 | 78.4 | 0.96 | 14.3 |
| 5 | Medium | 0.146 | 1837 | −71.0 | 1125 | 74.0 | 0.96 | 10.4 |
| 6 | High | 0.212 | 1472 | −64.7 | 760 | 88.2 | 0.92 | 13.7 |
| 7 | Low | 0.125 | 1473 | −61.0 | 802 | 69.9 | 0.94 | 7.6 |
| 8 | High | 0.218 | 1419 | −65.5 | 699 | 58.2 | 0.97 | 14.3 |
| 9 | Medium | 0.134 | 1561 | −76.1 | 724 | 71.9 | 0.96 | 10.2 |
| 10 | High | 0.175 | 1805 | −71.2 | 1022 | 104.1 | 0.91 | 12.5 |
| Mean | Low | 0.117c | 1797 | −75.9 | 1054 | 106.8 | 0.90 | 7.87b |
| | Medium | 0.152b | 1771 | −67.6 | 978 | 88.5 | 0.94 | 11.54a |
| | High | 0.202a | 1565 | −67.1 | 827 | 83.5 | 0.93 | 13.48a |
| Av. SED | | 0.0153 | 167.8 | 3.38 | 148.5 | 23.52 | 0.077 | 1.130 |
| P-value | | 0.003 | 0.389 | 0.050 | 0.380 | 0.623 | 0.410 | 0.006 |

Supplementary TABLE 3

Behaviours of steers as a percentage of time and number of hours per day. Behaviours were classified from collar mounted accelerometer data as described in the Sensor Deployment and Behavioural Classification sub-section of the Materials and Methods.

| Steer | Pasture intake treatment | Grazing | | Ruminating | | Walking | | Resting | | Other | |
|---|---|---|---|---|---|---|---|---|---|---|---|
| | | h/d | % | h/d | % | h/d | % | h/d | % | h | %/d |
| 1 | Low | 6.5 | 26.9 | 7.5 | 31.1 | 0.4 | 1.6 | 9.4 | 39.3 | 0.3 | 1.1 |
| 2 | Medium | 7.2 | 29.9 | 6.6 | 27.7 | 0.5 | 2.1 | 9.5 | 39.4 | 0.2 | 1.0 |
| 3 | Low | 5.8 | 24.2 | 5.8 | 24.2 | 0.4 | 1.8 | 11.6 | 48.2 | 0.4 | 1.6 |
| 4 | Medium | 7.7 | 32.0 | 6.5 | 26.9 | 0.3 | 1.3 | 6.6 | 27.5 | 3.0 | 12.3 |
| 5 | Medium | 6.1 | 25.4 | 8.0 | 33.4 | 0.6 | 2.6 | 9.0 | 37.4 | 0.3 | 1.2 |
| 6 | High | 7.3 | 30.4 | 6.4 | 26.6 | 0.4 | 1.8 | 9.7 | 40.4 | 0.2 | 0.8 |
| 7 | Low | 5.3 | 21.9 | 5.3 | 22.0 | 0.2 | 0.8 | 13.1 | 54.5 | 0.2 | 0.8 |
| 8 | High | 7.6 | 31.6 | 8.4 | 35.1 | 0.2 | 0.9 | 7.6 | 31.6 | 0.2 | 0.8 |
| 9 | Medium | 6.5 | 27.1 | 7.7 | 31.9 | 0.6 | 2.3 | 9.0 | 37.5 | 0.3 | 1.2 |
| 10 | High | 6.5 | 27.0 | 7.7 | 32.1 | 0.5 | 2.1 | 9.2 | 38.4 | 0.1 | 0.3 |
| Mean | Low | 5.84 | 24.3 | 6.2 | 25.8 | 0.34 | 1.40 | 11.4 | 47.3 | 0.28 | 1.17 |
| | Medium | 6.86 | 28.6 | 7.2 | 30.0 | 0.50 | 2.08 | 8.5 | 35.5 | 0.94 | 3.93 |
| | High | 7.12 | 29.7 | 7.5 | 31.3 | 0.38 | 1.60 | 8.8 | 36.8 | 0.15 | 0.63 |

Supplementary TABLE 3-continued

Behaviours of steers as a percentage of time and number of hours per day. Behaviours were classified from collar mounted accelerometer data as described in the Sensor Deployment and Behavioural Classification sub-section of the Materials and Methods.

| Steer | Pasture intake treatment | Grazing h/d | Grazing % | Ruminating h/d | Ruminating % | Walking h/d | Walking % | Resting h/d | Resting % | Other h | Other %/d |
|---|---|---|---|---|---|---|---|---|---|---|---|
| | Av. SED | 0.499 | 2.08 | 0.75 | 3.13 | 0.107 | 0.445 | 1.11 | 4.63 | 0.687 | 2.86 |
| | P-value | 0.499 | 0.499 | 0.273 | 0.273 | 0.327 | 0.327 | 0.074 | 0.074 | 0.474 | 0.474 |

Future trials can be used to optimise the algorithm.

The current algorithm explains ~60% of the variation in pasture intake. Inclusion of other sensors may be used to increase this value. Our current thought is that audio classification of biting behaviour might assist in this respect.

The audio based classification might also assist in 'selectivity' discrimination. This feature would allow identification of the type of pasture being consumed in a multi-pasture species environment. This feature is important as pasture species vary greatly in the amount of nutrient contained.

The current approach uses classification of behaviours post collection. Future iterations of this invention are likely to perform the classification step on animal.

The future of livestock breeding may comprise livestock phonemics including precision livestock management and accelerating genetic improvement and capture.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for monitoring pasture intake by an animal of a grazing animal species, the system comprising:
   a sensor spatially associated with a body part of the animal to generate movement data indicative of movement of the body part of the animal associated with multiple points in time;
   a processing server comprising:
   a data interface to receive the movement data; and
   a processor configured to perform steps of:
   (a) evaluating the received movement data, by considering the received movement data during a time window, to determine, for each of the multiple points in the time, an indication of a behaviour of the animal during the time window;
   (b) determining a count of a number of points in the time a grazing behaviour was determined in step (a) based on the received movement data, to determine, based on the count of the number of the points in the time, a period of time value indicative of how long the behaviour was shown by the animal;
   (c) determining a pasture intake value, indicative of an amount of pasture taken in by the animal, as a function of the period of time value determined in step (b) and indicative of how long the behaviour was shown by the animal, the indication of said behaviour having been determined in step (a) based on the received movement data indicative of the movement of the body part of the animal; and
   (d) repeatedly updating the pasture intake value by performing steps (a)-(c) as further new movement data is received.

2. The system of claim 1, wherein the sensor comprises an acceleration sensor.

3. The system of claim 1, wherein the sensor is mounted by a collar on a neck of the animal or by a halter on a head of the animal or by an ear tag.

4. A method performed by a computer, for monitoring pasture intake by an animal of a grazing animal species, the method performed by the computer comprising steps of:
   (a) evaluating received movement data associated with multiple points in time, by considering the received movement data during a time window, to determine for each of the multiple points in the time an indication of a behaviour of the animal during the time window;
   (b) determining a count of a number of points in the time a grazing behaviour was determined in step (a) based on the received movement data, to determine, based on the count of the number of points in the time, a period of time value indicative of how long the behaviour was shown by the animal;
   (c) determining a pasture intake value, indicative of an amount of pasture taken in by the animal, based on the period of time value determined in step (b) and indicative of how long the behaviour was shown by the animal, the indication of said behaviour having been determined in (a) based on the received movement data indicative of movement of the body part of the animal; and
   (d) repeatedly updating the pasture intake value by performing steps (a)-(c) as further new movement data is received.

5. The method of claim 4, wherein to determine the indication of the behaviour comprises to select one of multiple candidate behaviours.

6. The method of claim 5, wherein the multiple candidate behaviours comprise grazing, resting, ruminating, walking and other.

7. The method of claim 4, wherein said evaluating the received movement data comprises applying a trained machine learning model to the received movement data.

8. The method of claim 7, wherein the trained machine learning model is a linear regression model.

9. The method of claim 8, wherein the trained machine learning model is based on a slope of the linear regression model.

10. The method of claim 7, further comprising training the machine learning model based on historical observations of the animal.

11. The method of claim 4, wherein said determining the pasture intake value comprises evaluating a linear function for the period of time value.

12. The method of claim 11, further comprising generating an output on a user interface indicative of the pasture intake value.

13. The method of claim 12, wherein said generating the output on the user interface comprises determining a characteristic of a grazing environment of the animal based on the pasture intake value and the output comprises an indication of the grazing environment.

14. The method of claim 12, wherein the output is indicative of one or more of paddock status, biomass availability and animal preferences.

15. A selection method for selecting an individual or reproductive or regenerative material from the individual for use in breeding, artificial insemination, in vitro fertilization, embryo implantation, or transgenics, the selection method comprising performing, by a computer, a monitoring method for monitoring pasture intake by an animal of a grazing animal species, and then selecting the individual or reproductive or regenerative material, the monitoring method performed by the computer comprising steps of:
  (a) evaluating received movement data associated with multiple points in time, by considering the received movement data during a time window, to determine for each of the multiple points in the time an indication of a behaviour of the animal during the time window;
  (b) determining a count of a number of points in the time a grazing behaviour was determined in step (a) based on the received movement data, to determine, based on the count of the number of points in the time, a period of time value indicative of how long the behaviour was shown by the animal;
  (c) determining a pasture intake value, indicative of an amount of pasture taken in by the animal, based on the period of time value determined in step (b) and indicative of how long the behaviour was shown by the animal, the indication of said behaviour having been determined in (a) based on the received movement data indicative of movement of the body part of the animal; and
  (d) repeatedly updating the pasture intake value by performing steps (a)-(c) as further new movement data is received.

16. A production process for producing genetic gain in a population, the production process comprising performing, by a computer, a monitoring method for monitoring pasture intake by an animal of a grazing animal species, and then selecting an individual having a high estimated breeding value from the population, the monitoring method performed by the computer comprising steps of:
  (a) evaluating received movement data associated with multiple points in time, by considering the received movement data during a time window, to determine for each of the multiple points in the time an indication of a behaviour of the animal during the time window;
  (b) determining a count of a number of points in the time a grazing behaviour was determined in step (a) based on the received movement data, to determine, based on the count of the number of points in the time, a period of time value indicative of how long the behaviour was shown by the animal;
  (c) determining a pasture intake value, indicative of an amount of pasture taken in by the animal, based on the period of time value determined in step (b) and indicative of how long the behaviour was shown by the animal, the indication of said behaviour having been determined in (a) based on the received movement data indicative of movement of the body part of the animal; and
  (d) repeatedly updating the pasture intake value by performing steps (a)-(c) as further new movement data is received.

17. The production process of claim 16, further comprising obtaining reproductive or regenerative material from the selected individual.

\* \* \* \* \*